(12) United States Patent
Kondo et al.

(10) Patent No.: US 6,687,388 B2
(45) Date of Patent: Feb. 3, 2004

(54) PICTURE PROCESSING APPARATUS

(75) Inventors: Tetsujiro Kondo, Tokyo (JP);
Hisakazu Shiraki, Kanagawa (JP);
Hideo Nakaya, Kanagawa (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 09/769,647

(22) Filed: Jan. 25, 2001

(65) Prior Publication Data
US 2001/0031069 A1 Oct. 18, 2001

(30) Foreign Application Priority Data

Jan. 28, 2000 (JP) ........................... P2000-020553

(51) Int. Cl.[7] .................................................. G06K 9/00
(52) U.S. Cl. .................... 382/107; 382/219; 382/224; 382/236; 375/240.16; 348/699
(58) Field of Search ................................. 382/107, 220, 382/236, 219, 218, 224; 73/488; 348/154–155, 699; 356/27; 375/240.16, 240.17

(56) References Cited

U.S. PATENT DOCUMENTS

| | | | | |
|---|---|---|---|---|
| 5,319,456 A | * | 6/1994 | Nishida et al. | 348/699 |
| 5,519,456 A | * | 5/1996 | Inamori | 348/699 |
| 5,627,591 A | * | 5/1997 | Lee | 375/240.16 |
| 5,852,470 A | | 12/1998 | Kondo et al. | |
| 5,946,044 A | | 8/1999 | Kondo et al. | |
| 6,094,232 A | * | 7/2000 | Bayazit et al. | 348/616 |
| 6,192,078 B1 | * | 2/2001 | Komiya et al. | 375/240.16 |
| 6,339,616 B1 | * | 1/2002 | Kovalev | 375/240.16 |
| 6,424,676 B1 | * | 7/2002 | Kono et al. | 375/240.16 |
| 6,430,223 B1 | * | 8/2002 | Lim | 375/240.16 |
| 6,496,539 B2 | * | 12/2002 | Watanabe et al. | 375/240.16 |
| 6,504,873 B1 | * | 1/2003 | Vehvilainen | 375/240.29 |
| 6,516,031 B1 | * | 2/2003 | Ishihara et al. | 375/240.16 |
| 2002/0054643 A1 | * | 5/2002 | Watanabe et al. | 375/240.17 |
| 2003/0035594 A1 | * | 2/2003 | Kondo et al. | 382/298 |

FOREIGN PATENT DOCUMENTS

JP          10-336676         12/1998

* cited by examiner

Primary Examiner—Timothy M. Johnson
Assistant Examiner—Barry Choobin
(74) Attorney, Agent, or Firm—Frommer Lawrence & Haug LLP; William S. Frommer

(57) ABSTRACT

Picture data of frames [−2] to [+2] of an input picture signal is stored to frame memories fm [−2] to fm [+2]. The picture data of the frame f [0] is supplied to an area extracting circuit. In addition, the picture data of each frame is supplied to a pixel extracting circuit. A horizontal direction DR calculating circuit and a vertical DR calculating circuit calculate a DR in the horizontal direction and a DR in the vertical direction, respectively, and determine the maximum values thereof. A voting range determining circuit and a voting range updating circuit perform a process for finally determining a voting range corresponding to the maximum value of the DR in the horizontal direction and the maximum value of the DR in the vertical direction and a process for designating a new area. A pixel extracting circuit extracts pixels on a straight line defined by straight line parameters. A dispersion calculating and straight line parameter holding circuit performs a process for calculating the dispersion of the extracted pixels, comparing the calculated values, and holding the calculated value and straight line parameters corresponding to the calculated value and a process for updating the straight line parameter. A straight line parameter voting circuit selects the maximum frequency of the supplied straight line parameters. A voting pixel updating circuit updates voting pixels.

23 Claims, 25 Drawing Sheets

PRIOR ART

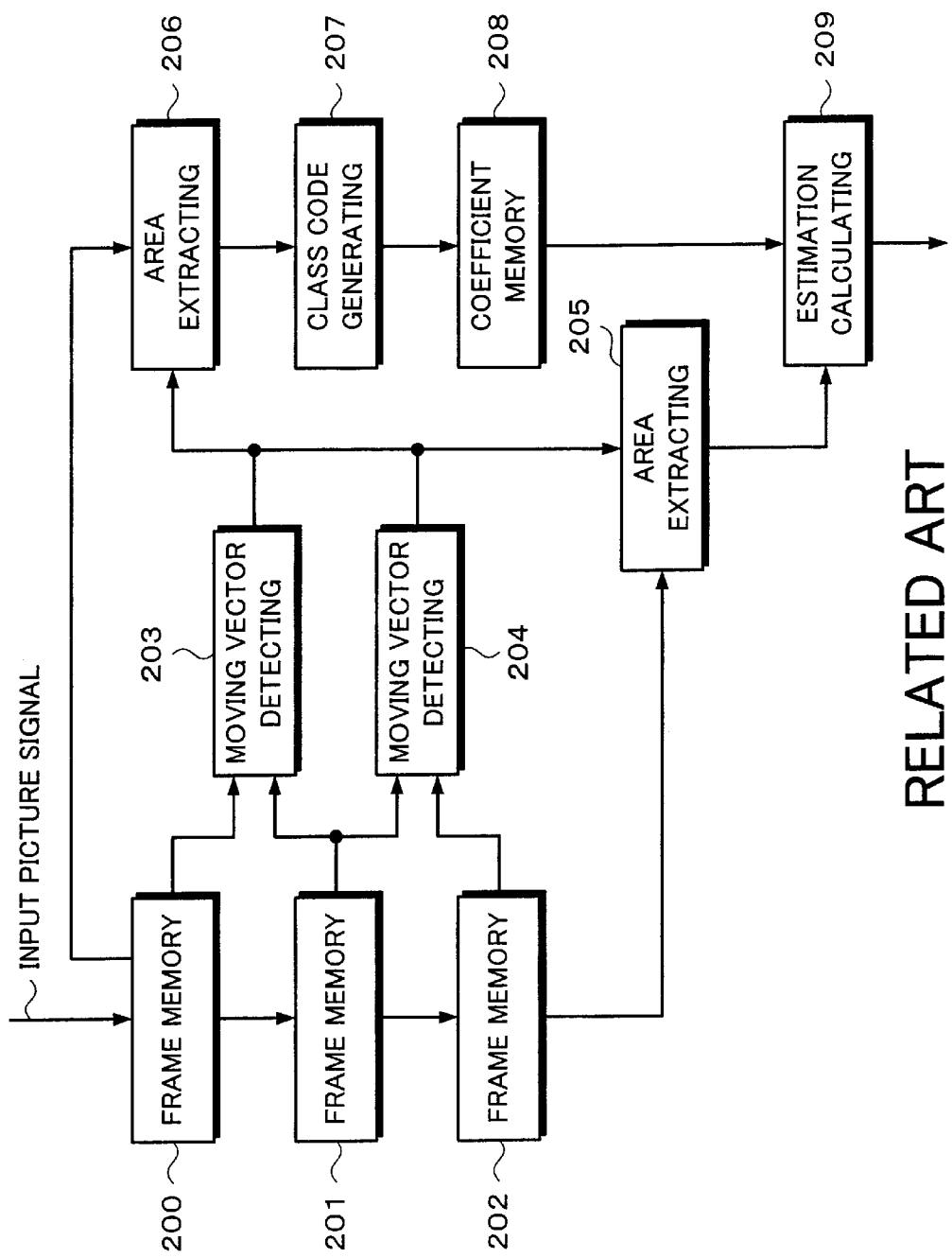

Fig. 3E     (−1,−1)    (0,0)    (1,1)

RELATED ART

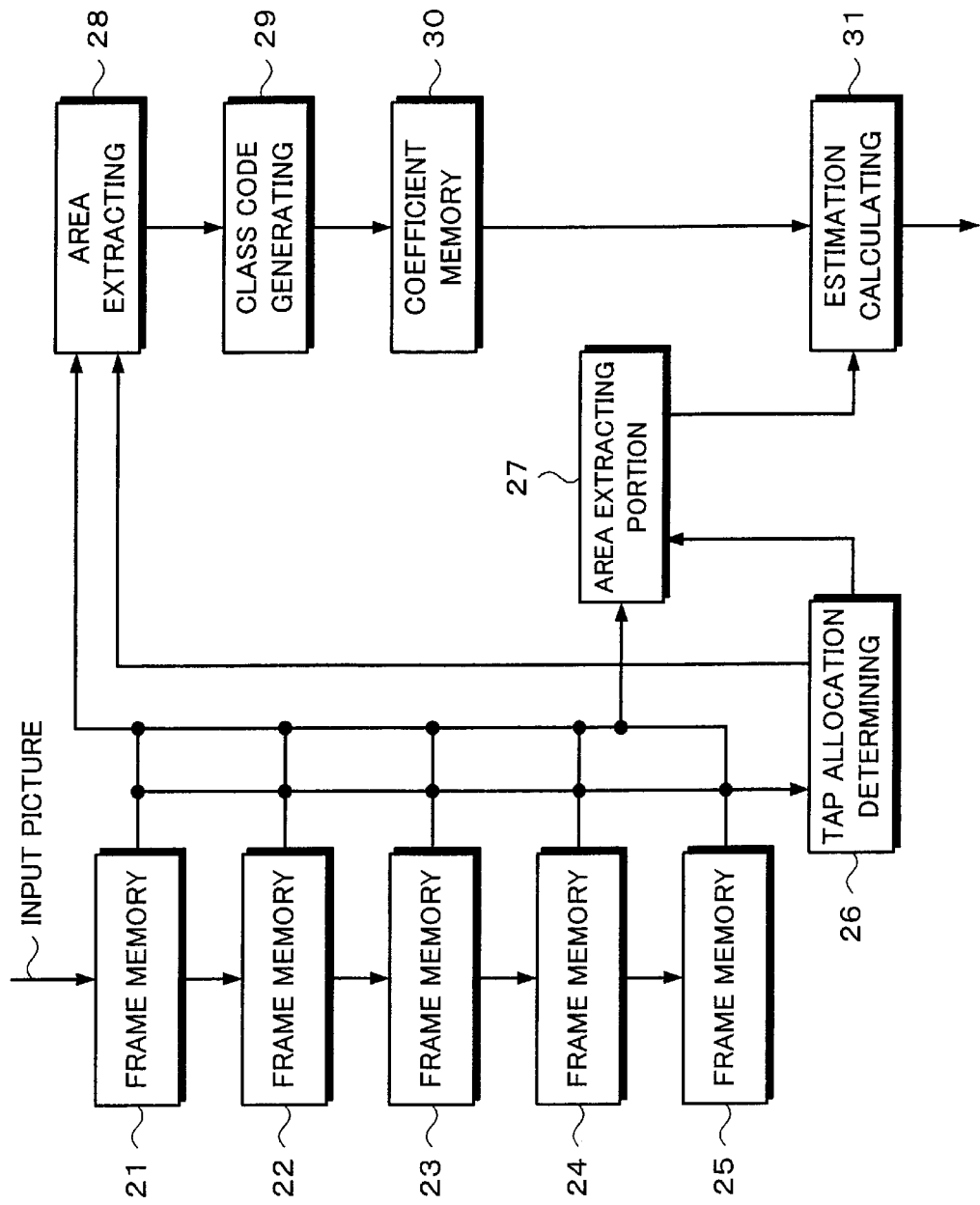

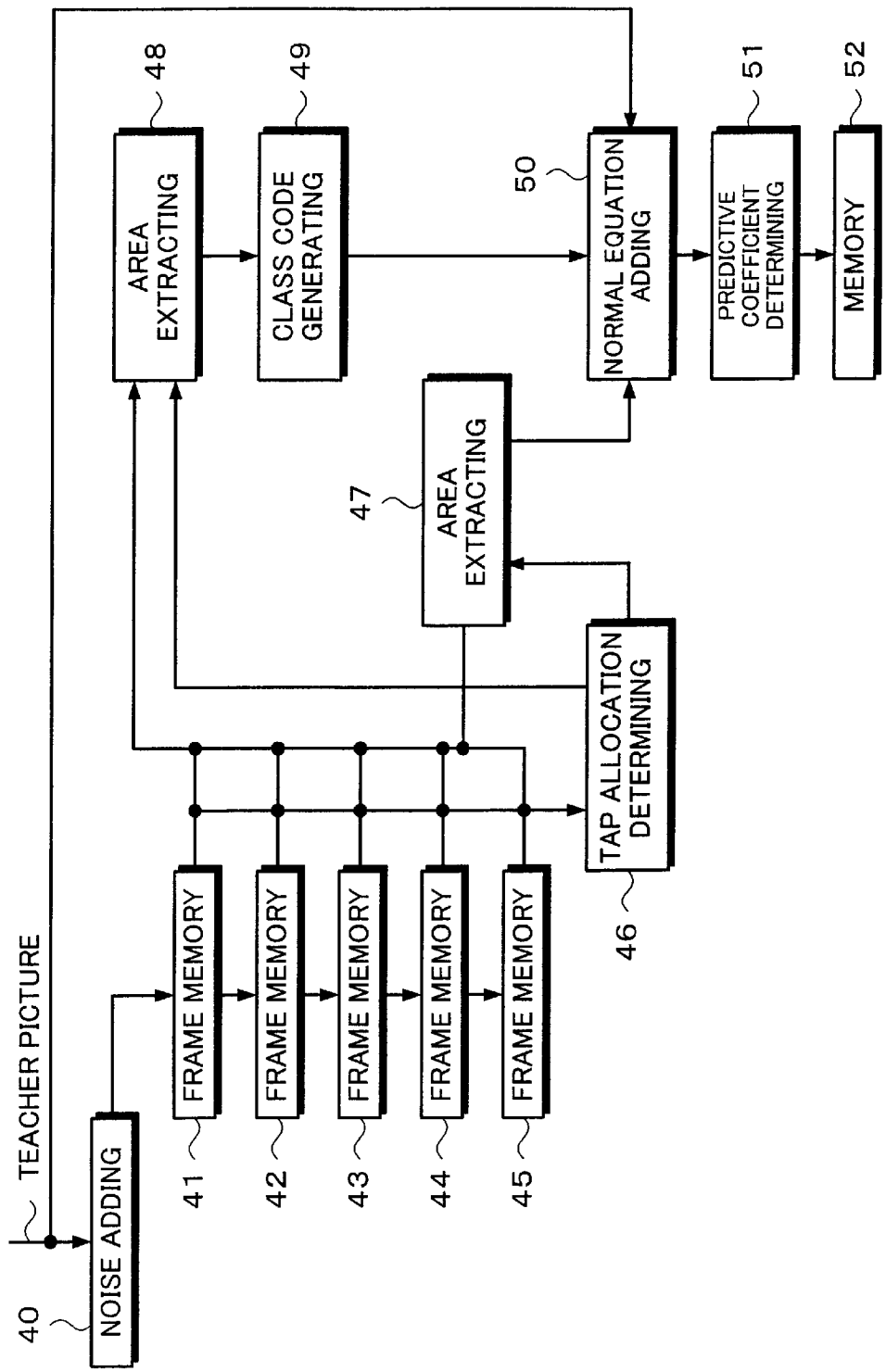

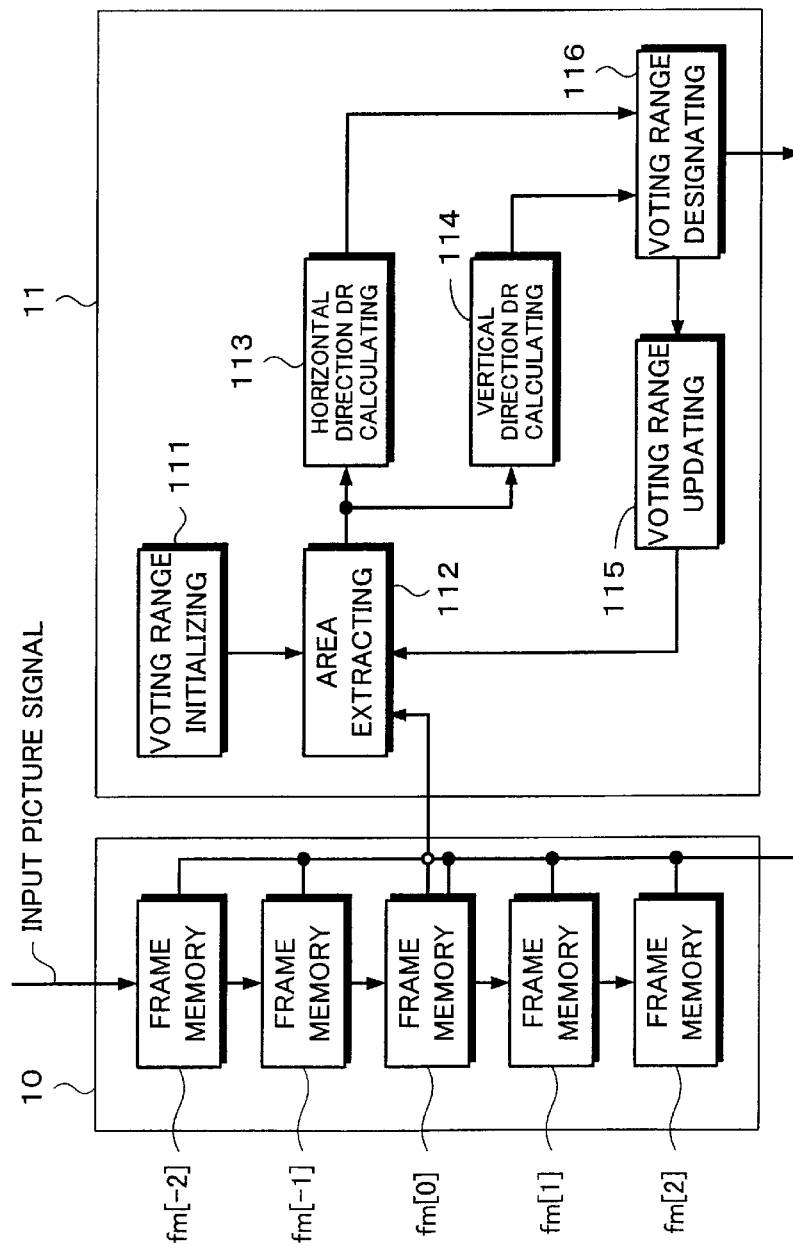

| FRAME NO. | CALCULATING EXPRESSION |
|---|---|
| f[-2] | $(-2a_0, -2b_0)$ |
| f[-1] | $(-a_0, b_0)$ |
| f[0] | $(0, 0)$ |
| f[+1] | $(+a_0, +b_0)$ |
| f[+2] | $(+2a_0, +2b_0)$ |

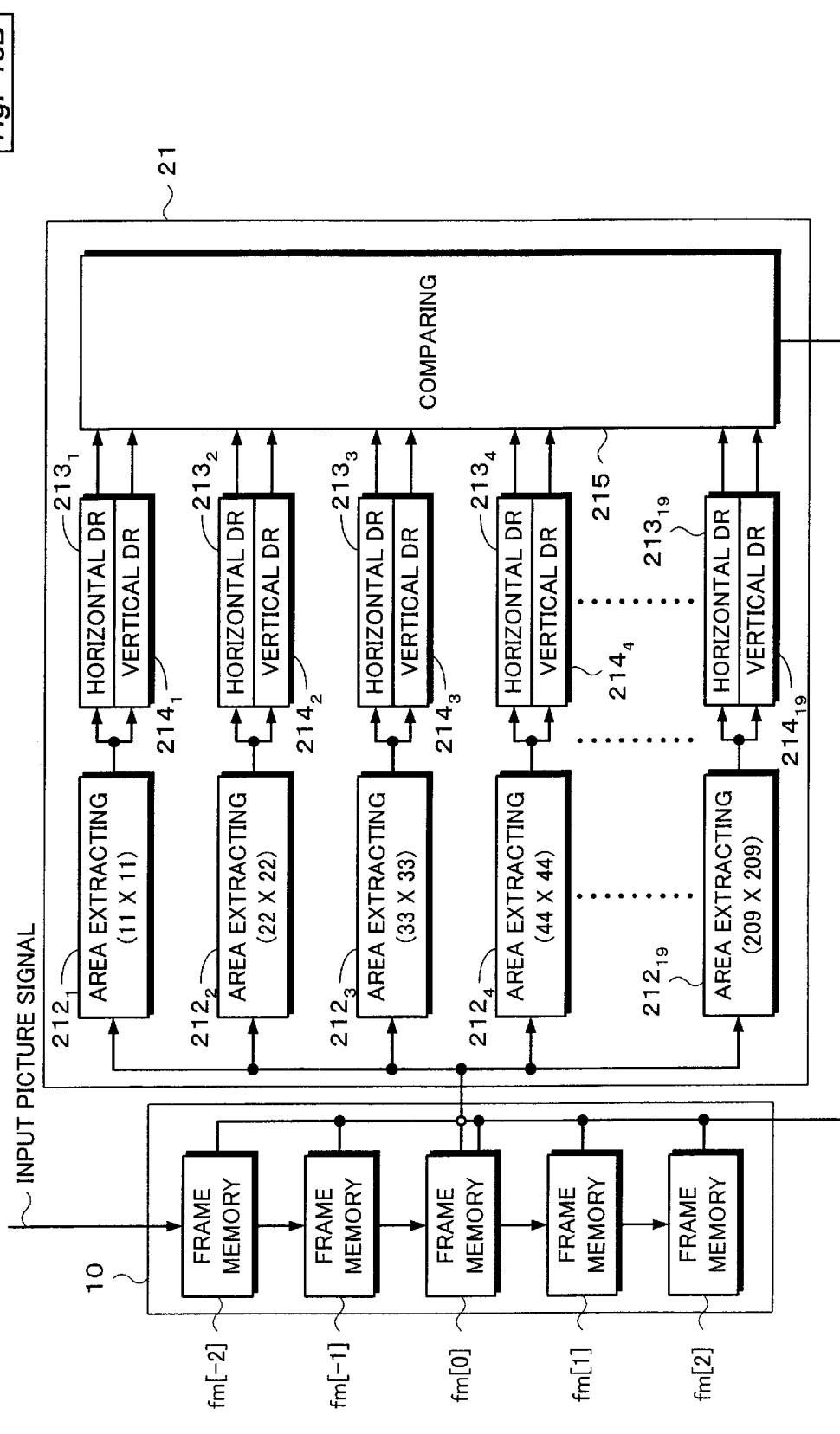

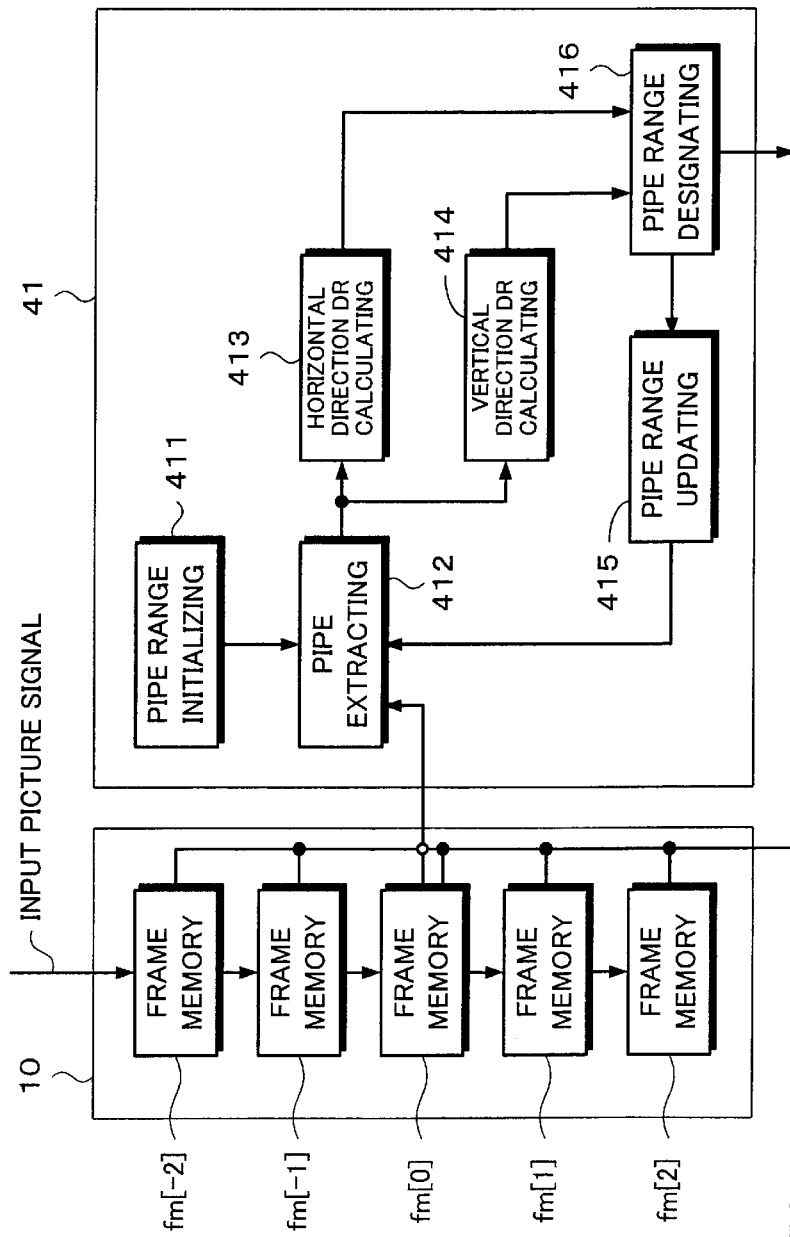

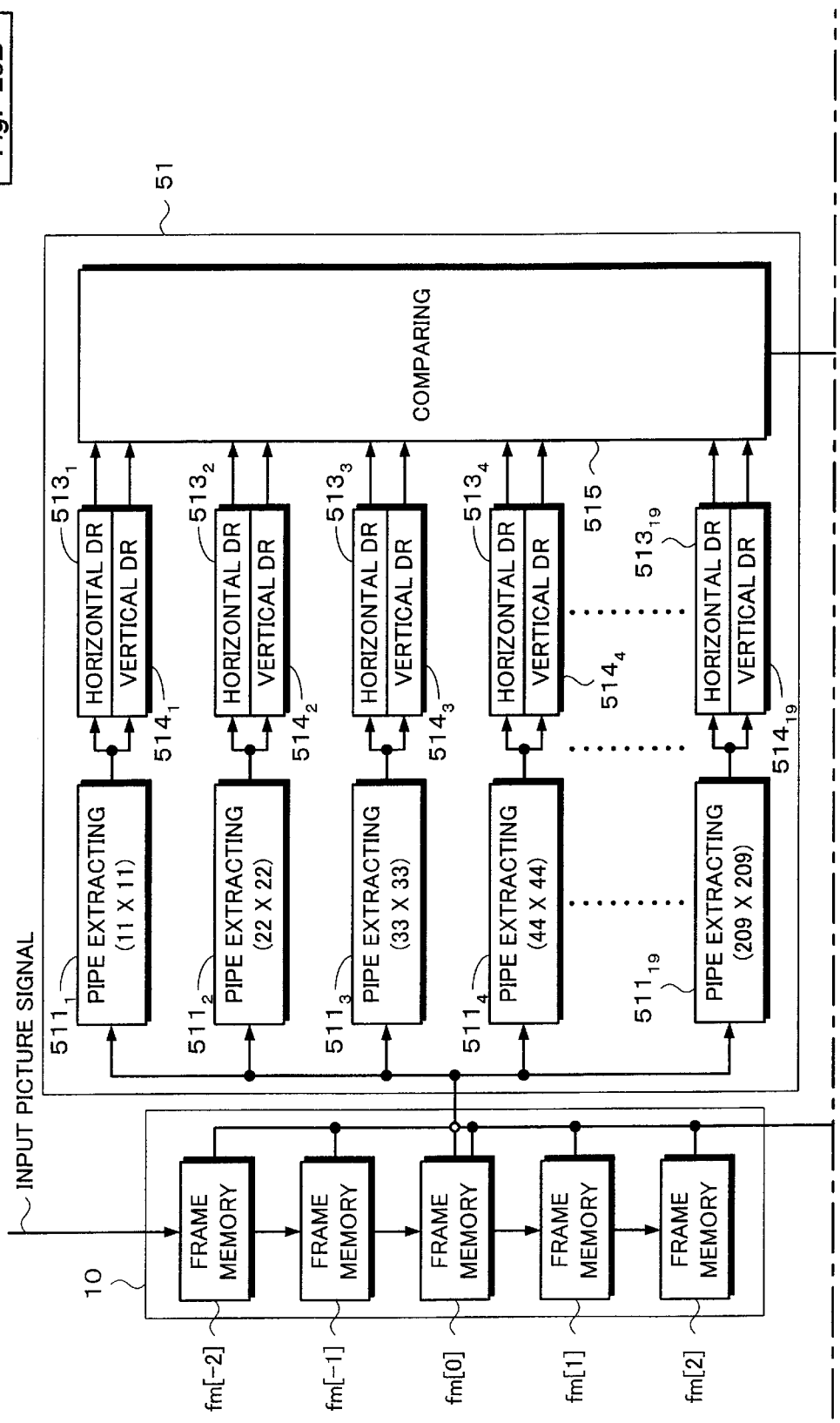

US 6,687,388 B2

PICTURE PROCESSING APPARATUS

BACKGROUND OF THE INVENTION

1. Field of the Invention

The present invention relates to a picture processing apparatus for detecting a moving vector of a moving picture.

2. Description of the Related Art

To eliminate noise from a picture, a motion adaptive type recursive filter has been used. An example of the structure of the motion adaptor recursive filter is shown in FIG. 1. Picture data of a considered frame (namely, an input frame at each time point) is supplied to a subtracting circuit 1100. Picture data of the preceding frame (one frame earlier than the considered frame) is supplied from a frame memory 1099 to the subtracting circuit 1100. An output of the subtracting circuit 1100 is supplied to an absolute value calculating circuit 1101. The absolute value calculating circuit 1101 converts the output data of the subtracting circuit 1100 into an absolute value. The absolute value is supplied to a threshold value processing circuit 1102. The threshold value processing circuit 1102 compares the supplied absolute value with a predetermined threshold value so as to determine whether the picture moves or stops for each pixel.

The determined result of the threshold value processing circuit 1102 is supplied to a weight designated value generating circuit 1103. The weight designated value generating circuit 1103 designates a weight designated value k corresponding to the supplied determined result. The weight designated value k is supplied to an amplifier 1105. The amplifier 1105 adjusts the amplitude of the input frame. An amplifier 1104 amplifies the input signal by k times. On the other hand, the amplifier 1105 amplifies pixel date stored in the frame memory by (1−k) times.

When the threshold value processing circuit 1102 has determined that the picture of the current frame stops, a fixed value ranging from 0 to 0.5 as the value k is designated. Thus, an output of an adder 1106 disposed downstream of the amplifiers 1104 and 1105 becomes a weighted value of a pixel value of the considered frame and a pixel value of the preceding frame. On the other hand, when the threshold value processing circuit 1102 has determined that the picture of the current frame moves, "1" is designated to the value k. As a result, the adder 1106 directly outputs a pixel value of the considered frame.

The above-described motion adaptive type recursive filter has problems (a) to (d) that follow. (a) Since a still portion is weighted with the fixed value k, if the intensity and/or direction of noise varies, the noise cannot be adequately eliminated. (b) When the noise level is large, a still portion is mistakenly determined as a moving picture. Thus, the noise eliminating effect deteriorates. (c) A moving portion may be mistakenly determined as a still picture. As a result, deterioration such as an occurrence of a trailing shape portion may take place. (d) Noise cannot be eliminated from a moving portion.

In addition, a noise eliminating method using a class category adaptive process has been proposed as Japanese Patent Application No. 10-304058. In the method, a block matching operation is performed so as to detect a moving vector. Corresponding to the detected moving vector, a class category adaptive process using pixels at the same position on frames is performed. Although the problems of the motion adaptive type recursive filter can be solved or alleviated using the method, it has the following problems.

(e) Since the block matching operation is performed, a heavy load is imposed to the apparatus. (f) The block matching operation should be performed between two adjacent frames (for example, between the frames t and (t+1), between the frames (t+1) and (t+2), and so forth). If the block matching operation fails for at least two adjacent frames, the noise elimination effect deteriorates. (g) In the block matching operation, a motion of a small object in a block cannot be detected. Thus, such a motion may result in an inadequate process.

In addition, as other related art references rather than the motion adaptive type recursive filter for detecting a moving vector, block matching method, slope method, and so forth are known. In the block matching method, the sum of differences of pixels of each block in each searching range should be calculated and compared. Thus, the amount of calculation becomes large. Consequently, there are problems from view points of the circuit scale, the process time, and so forth. In addition, a small motion in a block cannot be accurately detected. In the slope mode, if a picture contains noise, the detection accuracy of the moving amount remarkably deteriorates.

Next, the above-described related art reference (Japanese Patent Application No. 10-304058 and corresponding U.S. patent application Ser. No. 09/602,934 filed on Oct. 25, 1999) that had not been disclosed on the filing date of the prior Japanese application of the present patent application will be described in detail. FIG. 2 shows an example of the structure of the related art reference. As was described above, in the related art reference, in a combination of the block matching operation and the class category adaptive process, noise is eliminated from a moving picture. An input picture signal from which noise should be removed is supplied to a frame memory 200. Frame memory 201 and 202 are connected in a shift register shape to the frame memory 200. Thus, picture data of three chronologically successive frames are stored to the frame memories 200, 201, and 202.

The frame memories 200 and 201 supply stored frames to a moving vector detecting portion 203. The moving vector detecting portion 203 performs a block matching operation for the two supplied frames and detects a moving vector. The moving vector detecting portion 203 supplies the detected moving vector to area extracting portions 205 and 206. In addition, the frame memories 200, 201, and 202 supply their stored frames to the area extracting portion 205 and 206. A moving vector detecting portion 204 performs the block matching operation corresponding to the supplied two frames and detects a moving vector. The moving vector detecting portion 204 supplies the detected moving vector to the area extracting portions 205 and 206.

The frames stored in the frame memories 200, 201, 202 are supplied to the area extracting portion 206. The area extracting portion 206 references the moving vector supplied from the moving vector detecting portion 203 and the moving vector supplied from the moving vector detecting portion 204 and extracts a picture area at a predetermined position from the supplied frame and supplies data of the extracted picture area to a class code generating portion 207. The class code generating portion 207 extracts a space-time pattern of pixel values corresponding to for example ADRC (Adaptive Dynamic Range Coding) method and generates a class code that represents a class categorized corresponding to the extracted pattern.

Since the picture area that is extracted by the area extracting portion 206 is used for a class category process, such a picture area is referred to as class tap. The class code is supplied to a coefficient memory 208. The coefficient memory 208 stores a predictive coefficient set for individual classes. The coefficient memory 208 outputs a predictive coefficient corresponding to a class code. An output of the coefficient memory 208 is supplied to an estimation calculating portion 209.

On the other hand, picture data of frames stored in the frame memories 200, 201, and 202 are supplied to the area extracting portion 205. The area extracting portion 205 references moving vectors supplied from the moving vector detecting portions 204 and 203, extracts picture areas from the picture data of the supplied frames, and supplies data of the extracted picture areas to the estimation calculating portion 209. The estimation calculating portion 209 performs a predetermined calculation corresponding to the data supplied from the area extracting portion 205 and predictive coefficient set supplied from the coefficient memory 208 and generates a resultant output picture. Noise has been eliminated or alleviated in the output picture. The picture area extracted from the area extracting portion 205 is used for a calculation for predictively generating an output picture. The picture area is referred to as class tap.

Next, with reference to FIGS. 3A to 3E, the tap structures of a class tap and a predictive tap that are extracted by the area extracting portions 206 and 207 will be described. In FIGS. 3A to 3D, a considered pixel that is predicted is denoted by a black circle. In addition, pixels extracted as class taps or predictive taps are denoted by shaded circles. FIG. 3A shows an example of a basic class tap structure. Pixels at the same spatial position of the considered frame f [0] containing the considered pixel, the immediately earlier frame f [−1] and the immediately later frame f [+1] are extracted as class taps. FIG. 3B shows an example of a basic predictive class tap structure. A total of 13 pixels of a considered pixel and 12 pixels surrounding the considered pixel are extracted as predictive taps from picture data of a considered frame and picture data of frames at the immediately earlier and later frames of the considered frame.

FIGS. 3C and 3D show that pixels that are extracted are chronologically moved corresponding to moving vectors that are output from the moving vector detecting portions 203 and 204. As shown in FIG. 3E, when the moving vector of a considered frame is (0, 0), the moving vector of the immediately earlier frame is (−1, −1), and the moving vector of the immediately later frame is (1, 1), the extracting positions of the class taps and the predictive taps of all those frames are parallel-translated corresponding to the moving vectors. Thus, according to the structure of the related patent application, before extracting class taps and predictive taps, it is necessary to detect moving vectors. In that case, the block matching operation for detecting moving vectors requires a large amount of calculation. Thus, a large load is applied to the apparatus.

OBJECTS AND SUMMARY OF THE INVENTION

Therefore, an object of the present invention is to provide a processing apparatus and a processing method for accurately calculating a moving vector of a moving picture.

A first aspect of the present invention is a picture processing apparatus, comprising an extracting means for extracting a plurality of pixels on each straight line that extends in the chronological direction and that passes through each of objective pixels including a considered pixel of a picture signal and a plurality of pixels in the vicinity of the considered pixel, a similarity detecting means for detecting the similarity in each of the straight lines according to the pixel values of a plurality of pixels extracted by the extracting means in each of the straight lines for each of the objective pixels against the considered pixel, and a moving vector calculating means for calculating a moving vector of the considered pixel according to the similarity detected in each of the straight lines for each of the objected pixels.

A second aspect of the present invention is a picture processing apparatus, comprising an extracting means for extracting a plurality of pixels on a particular straight line that passes through a considered pixel of a picture signal and that extends in the chronological direction and on each of straight lines parallel to the particular straight line that pass through pixels in the vicinity of the considered pixel, a similarity detecting means for detecting similarity in the direction of each of the straight lines for the plurality of pixels extracted by the extracting means in the direction of each of the straight lines, and a moving vector calculating means for calculating a moving vector of the considered pixel according to the similarity detected in the direction of each of the straight lines.

A third aspect of the present invention is a picture processing method, comprising the steps of (a) extracting a plurality of pixels on each straight line that extends in the chronological direction and that passes through each of objective pixels including a considered pixel of a picture signal and a plurality of pixels in the vicinity of the considered pixel, (b) detecting the similarity in each of the straight lines according to the pixel values of a plurality of pixels extracted at the step (a) in each of the straight lines for each of the objective pixels against the considered pixel, and (c) calculating a moving vector of the considered pixel according to the similarity detected in each of the straight lines for each of the objected pixels.

A fourth aspect of the present invention is a picture processing method, comprising the steps of (a) extracting a plurality of pixels on a particular straight line that passes through a considered pixel of a picture signal and that extends in the chronological direction and on each of straight lines parallel to the particular straight line that pass through pixels in the vicinity of the considered pixel, (b) detecting the similarity in the direction of each of the straight lines for the plurality of pixels extracted at the step (a) in the direction of each of the straight lines, and (c) calculating a moving vector of the considered pixel according to the similarity detected in the direction of each of the straight lines.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a block diagram for explaining a structure for eliminating noise of the related art;

FIGS. 3A to 3E are schematic diagrams for explaining a tap structure in the structure shown in FIG. 2;

FIG. 4 is a block diagram for explaining the structure for eliminating noise according to a first embodiment of the present invention;

FIG. 5 is a block diagram for explaining the structure for generating predictive coefficients according to the first embodiment of the present invention;

DETAILED DESCRIPTION OF THE PREFERRED EMBODIMENTS

Figure 1:
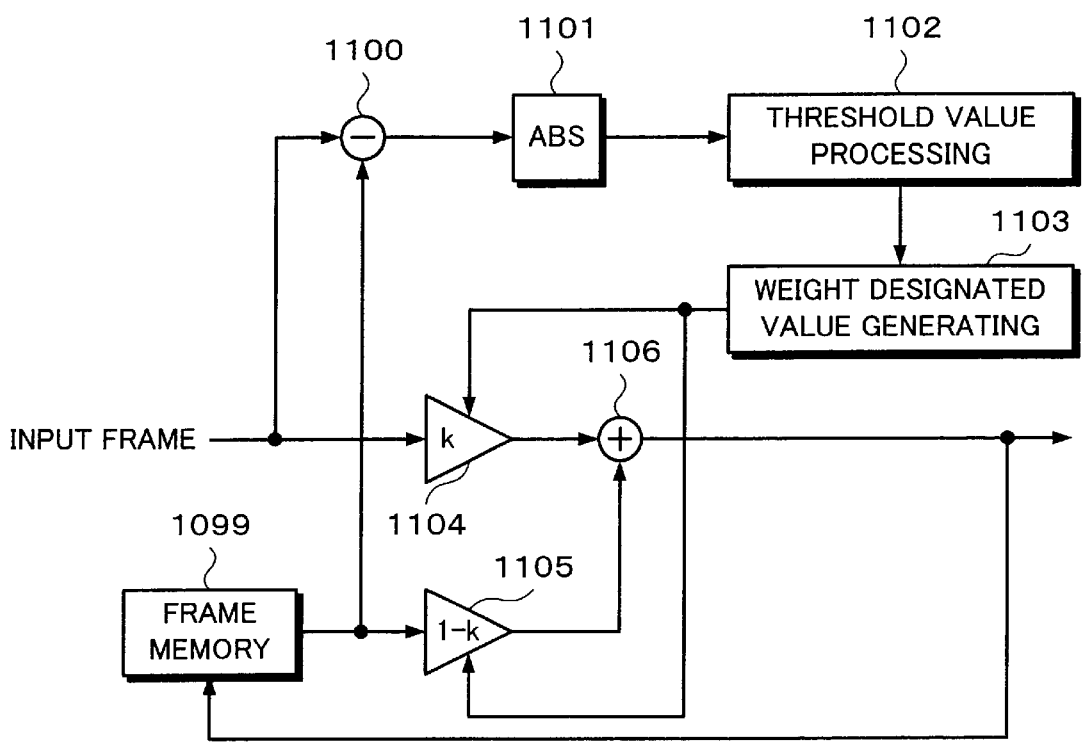
FIG. 1 is a block diagram for explaining a conventional technology.
Figure 3A:
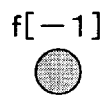
Figure 3B:
Figure 3C:
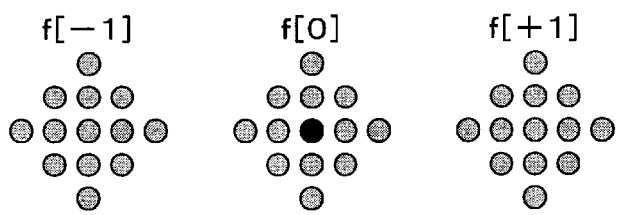
Figure 3D:
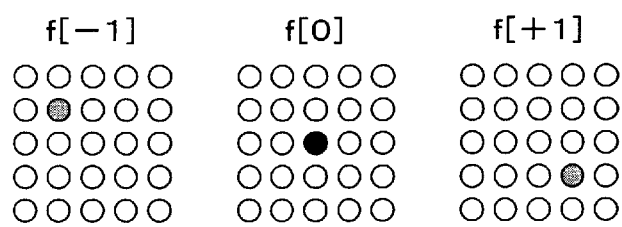

A first embodiment of the present invention will be described. FIG. 4 shows an example of the structure for performing a predictive estimating process according to the first embodiment of the present invention. Referring to FIG. 4, an input picture signal is supplied to a frame memory 21. Frame memories 22, 23, 24, and 25 are successively connected in a shift register shape to the frame memory 21. Thus, the frame memories 22, 23, 24, and 25 store picture data of chronologically successive five frames. In the following description, it is assumed that picture data stored in the frame memory 23 is treated as picture data of a considered frame. Picture data stored in the frame memory 24 is treated as picture data one frame earlier than the considered frame. Picture data stored in the frame memory 25 is treated as picture data two frames earlier than the considered frame. Picture data stored in the frame memory 22 is treated as picture data one frame later than the considered frame. Picture data stored in the frame memory 21 is treated as picture data two frames later than the considered frame.

Picture data of the frames stored in the frame memories 22, 23, 24, and 25 are supplied to a tap allocation designating portion 26. The tap allocation designating portion 26 designates the positions of pixels that are extracted as class taps and predictive taps corresponding to the supplied data. Information of the positions of pixels that are extracted as class taps is supplied to an area extracting portion 28. In addition, information of the positions of pixels that are extracted as predictive taps is supplied to an area extracting portion 27. Picture data of frames stored in the frame memories 22, 23, 24, and 25 are supplied to the area extracting portions 27 and 28. The area extracting portion 28 extracts pixels at the positions corresponding to the information supplied from the tap allocation designating portion 26 as class taps from the supplied frames. On the other hand, the area extracting portion 27 extracts pixels at the positions corresponding to the information supplied from the tap allocation designating portion 26 from the supplied frames.

The area extracting portion 28 supplies data of the extracted class taps to a class code generating portion 29. The class code generating portion 29 performs a quantizing process corresponding to for example ADRC method or DR (Dynamic Range) method for the supplied data, extracts a space-time pattern, and generates a class code that represents a class categorized corresponding to the extracted pattern. In the case of a still picture that is free of noise, the pixel values at the same spatial positions of frames do not vary. In the case of a moving picture that fast moves, although it may deteriorate (for example, an occurrence of an unclear picture), pixels at the same spatial position of frames chronologically do not vary.

Thus, when the pixel values at the same spatial positions of frames vary, it is assumed that noise takes place. Consequently, when only one pixel is extracted in a class tap structure that spreads in only the chronological direction and the ADRC process is performed for the data of the extracted pixel, a noise component of each frame can be obtained. As the number of bits of a requantized code generated in the ADRC process is large, the fluctuation of the noise level can be more accurately detected. When the DR value is quantized and a class code is calculated with the quantized value and the requantized code, the noise level can be distinguished.

Next, the ADRC process will be described. The ADRC process is an adaptive re-quantizing method developed for a highly efficient encoding process for use with a VCR (Video Cassette Recorder). The ADRC process features in that a local pattern of a signal level can be effectively represented with a short word length. Thus, the ADRC process can be used for detecting a space-time pattern of a picture signal. In other words, by the following formula (1), the difference between the maximum value MAX and the minimum value MIN in an area extracted as class taps is equally divided by a predetermined number of bits so as to perform a re-quantizing process.

$DR = MAX - MIN + 1$ $Q = [(L - MIN + 0.5) \times 2^n / DR]$ (1)

where DR is the dynamic range of the area; n is the number of assigned bits (for example, n=2); L is a data level of pixels in the area; Q is a re-quantized code; and "[ ]" (bracket) represents a round-off process.

Thus, pixel data of class taps (each pixel is composed of for example eight bits) is converted into for example a two-bit re-quantized code value. With the re-quantized code value generated in such a manner, a pattern of the level distribution of data of the class taps can be represented with a smaller amount of data. In the case of the tap structure of class taps composed of for example seven pixels, when the above-described process is performed, seven re-quantized codes $q_1$ to $q_7$ corresponding to those pixels are generated. With those output re-quantized codes, the class code class generated by the class code generating portion 29 is expressed by the following formula (2).

$$\text{class} = \sum_{i=1}^{n} q_i (2^p)^i \quad (2)$$

where n is the number of pixels extracted as class taps; and p is for example 2.

The class code is supplied to a coefficient memory 30. The coefficient memory 30 stores a predictive coefficient set corresponding to individual classes. The coefficient memory 30 outputs a predictive coefficient corresponding to the supplied class code. An output of the coefficient memory 30 is supplied to an estimation calculating portion 31. On the other hand, the area extracting portion 27 supplies data of the extracted predictive taps to the estimation calculating portion 31. The estimation calculating portion 31 performs a calculation expressed by the following formula (3) with the data supplied from the area extracting portion 27 and the predictive coefficient set supplied from the coefficient memory 30 and successively generates pixel values y of the output picture.

$$y = W_1 \times X_1 + W_2 \times X_2 + \ldots + W_n \times X_n \quad (3)$$

where $X_1, \ldots,$ and $X_n$ are pixel data of predictive taps; and $W_1, \ldots, W_n$ are predictive coefficients.

Next, with reference to FIG. 5, a learning process according to the first embodiment of the present invention will be described. In the learning process, a predictive coefficient set is designated. A noise-free picture that is generated as a result of a picture information converting process is supplied to a noise adding portion 40 and a normal equation adding portion 50. Hereinafter, such a picture is referred to as teacher picture. The noise adding portion 40 adds a noise component to the supplied teacher picture. An output of the noise adding portion 40 is supplied to a frame memory 41. Frame memories 42, 43, 44, and 45 are connected in a shift register shape to the frame memory 41. Thus, the frame memories 42, 43, 44, and 45 store picture data of five chronologically successive frames. In the following description, it is assumed that picture data stored in the frame memory 43 is picture data of a considered frame. Picture data stored in the frame memory 44 is picture data of one frame earlier than the considered frame. Picture data stored in the frame memory 45 is picture data of two frames earlier than the considered frame. Picture data stored in the frame memory 46 is picture data of one frame later than the considered frame. Picture data stored in the frame memory 47 is picture data of two frames later than the considered frame.

Data of frames stored in the frame memories 41 to 45 are supplied to a tap allocation designating portion 46. As with the tap allocation designating portion 26 shown in FIG. 4, the tap allocation designating portion 46 designates the positions of pixels extracted as class taps and predictive taps corresponding to the supplied data. Information representing the positions of the pixels extracted as class taps is supplied to an area extracting portion 48. In addition, information representing positions of pixels that are extracted as predictive taps is supplied to an area extracting portion 47.

Figures 10A, 10B:
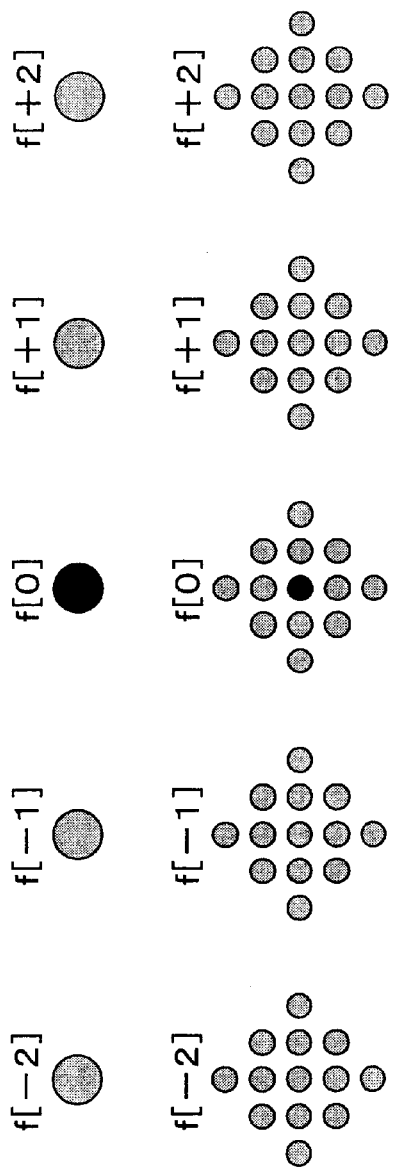
FIGS. 10A and 10B are schematic diagrams for explaining the basic tap structure according to the first embodiment of the present invention.

Frames stored in the frame memories 41 to 45 are supplied to the area extracting portions 47 and 48. The area extracting portion 48 extracts pixels at positions corresponding to information supplied from the tap allocation designating portion 46 as class taps from the supplied frames. On the other hand, the area extracting portion 47 extracts pixels at positions corresponding to the information supplied from the tap allocation designating portion 46 as predictive taps from the supplied frames. FIG. 10A shows an example of space-time positions of pixels extracted as class tap. FIG. 10B shows an example of space-time positions of pixels extracted as predictive taps.

The area extracting portion 48 supplies data of the extracted class taps to a class code generating portion 49. The class code generating portion 49 performs the same process as the class code generating portion 29 shown in FIG. 4, extracts a space-time pattern, and generates a class code that represents a class categorized corresponding to the extracted pattern. The class code is supplied to the normal equation adding portion 50.

On the other hand, the area extracting portion 47 supplies data of the extracted predictive taps to the normal equation adding portion 50. The normal equation adding portion 50 calculates data necessary for solving a normal equation for a solution of a predictive coefficient corresponding to the supplied teacher picture, the data of predictive taps, and the class code. An output of the normal equation adding portion 50 is supplied to a predictive coefficient designating portion 51. The predictive coefficient designating portion 51 performs a predetermined calculation and designates a predictive coefficient for individual classes. The designated predictive coefficient set is supplied and stored to a memory 52. When the predictive coefficient set is loaded from the memory 52 to the coefficient memory 30 shown in FIG. 4, the above-described predictive estimating process can be performed.

Next, a calculating process for determining a predictive coefficient set will be described. In the calculating process, a plurality of types of picture data are supplied to the structure shown in FIG. 5. When the number of types of picture data is denoted by m, the following formula (4) can be obtained from formula (3).

$$Y_k = W_1 \times X_{k1} + W_2 \times X_{k2} + \ldots + W_n \times X_{kn} \quad (4)$$

(where $k=1, 2, \ldots, m$)

When the relation of m>n is satisfied, since $w_1, \ldots,$ and $w_n$ are not uniquely obtained, elements $e_k$ of an error vector e are defined by the following formula (5). The predictive coefficient set is defined so that the square of the error vector e defined by the formula (6) becomes minimum. In other words, the predictive coefficient set is uniquely obtained by so-called method of least squares.

$$e_k = Y_k - \{W_1 \times X_{k1} + W_2 \times X_{k2} + w_n \times X_{kn}\} \quad (5)$$

(where $k=1, 2, \ldots m$)

$$e^2 = \sum_{k=0}^{m} e_k^2 \quad (6)$$

As a practical calculating method for obtaining a predictive coefficient set of which $e^2$ of formula (6) becomes minimum, $e^2$ is partially differentiated with respect to predictive coefficients $w^i$ (where i 1, 2, \ldots ) (as formula (7)).

Thereafter, each predictive coefficient $w_i$ is designated so that the partially differentiated value of each value of i becomes 0.

$$\frac{\partial e^2}{\partial w_i} = \sum_{k=0}^{m} 2\left(\frac{\partial e_k}{\partial w_i}\right) e_k = \sum_{k=0}^{m} 2x_{ki} \cdot e_k \qquad (7)$$

Next, a practical process for determining each predictive coefficients $w_i$ will be described. When $X_{ji}$ and $Y_i$ are defined by the following formulas (8) and (9), the formula (7) can be modified as a matrix expressed by the following formula (10).

$$X_{ji} = \sum_{p=0}^{m} x_{pi} \cdot x_{pj} \qquad (8)$$

$$Y_i = \sum_{k=0}^{m} x_{kj} \cdot y_k \qquad (9)$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_m \end{bmatrix} \qquad (10)$$

The formula (10) is generally referred to as normal equation. The normal equation adding portion 50 performs the calculations expressed by the formulas (8) and (9) so as to obtain $X_{ji}$ and $Y_i$ (where i=1, 2, . . . , n). The predictive coefficient designating portion 51 solves the normal equation (10) corresponding to a conventional matrix solution such as sweep-out method so as to obtain predictive coefficients $w_i$ (where i=1, 2, . . . , n).

Next, a process for adding noise to a teacher picture will be described in detail. The process is performed by the noise adding portion 40. There are four methods for adding noise to a teacher picture. In the first method, random noise is generated as a computer simulation. The generated noise is added to a teacher picture. In the second method, noise is added to a teacher picture through an RF system. In the third method, the difference between a first picture whose pixel level is constant and a second picture of which the first picture is output from an RF system is obtained. The difference is added to a teacher picture. In the fourth method, a picture whose pixel level is constant is supplied to an RF system. The difference between an output of an RF system and a picture of which frames are added is obtained so as to extract a noise component. The extracted noise component is added to a teacher picture.

Figure 6:
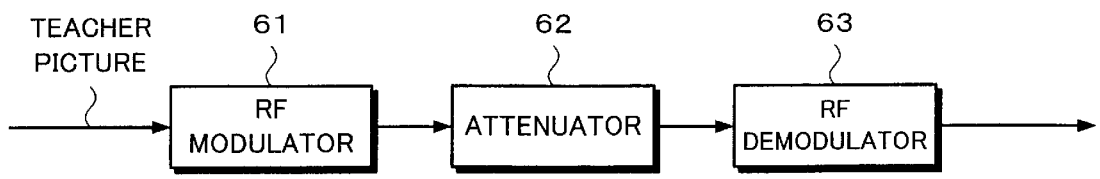
FIG. 6 is a block diagram showing an example of the structure for adding noise.

FIG. 6 shows an example of the structure according to the second method.

A teacher picture is supplied to an RF modulator 61. The RF modulator 61 RF-modulates the teacher picture. An output of the RF modulator 61 is supplied to an attenuator 62. The attenuator 62 attenuates the output of the RF modulator 61. An output of the attenuator 62 is supplied to an RF demodulator 63. The RF demodulator 63 RF-demodulates the output of the attenuator 62 so as to generate a picture of which noise is added to the teacher picture. In the second method, it is necessary to consider the deviation of pixel positions of the teacher picture and the student picture.

Figure 7:
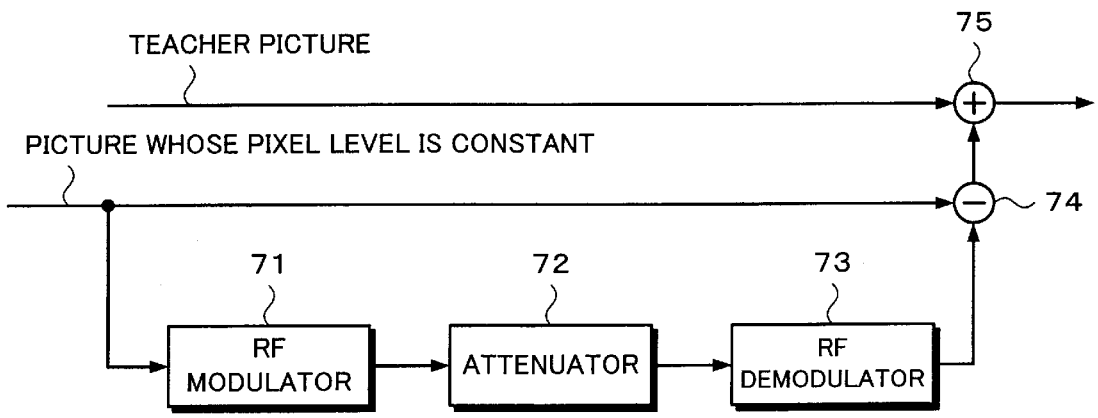
FIG. 7 is a block diagram showing another example of the structure for adding noise.

FIG. 7 shows an example of the structure according to the third method. A picture whose pixel level is constant is supplied to an RF modulator 71 and a subtracter 74. The RF modulator 71 RF-modulates the supplied picture. An output of the RF modulator 71 is supplied to an attenuator 72. The attenuator 72 attenuates the output of the RF modulator 71. An output of the attenuator 72 is supplied to an RF demodulator 73. The RF demodulator 73 RF-demodulates the output of the attenuator 72. An output of the RF demodulator 73 is supplied to the subtracter 74. The subtracter 74 obtains the difference between a picture whose pixel level is constant and the output of the RF demodulator 73. An output of the subtracter 74 is supplied to an adder 75. A teacher picture is also supplied to the adder 75. The adder 75 adds the output of the subtracter 74 to the teacher picture so as to generate a picture of which noise is added to the teacher picture.

Figure 8:
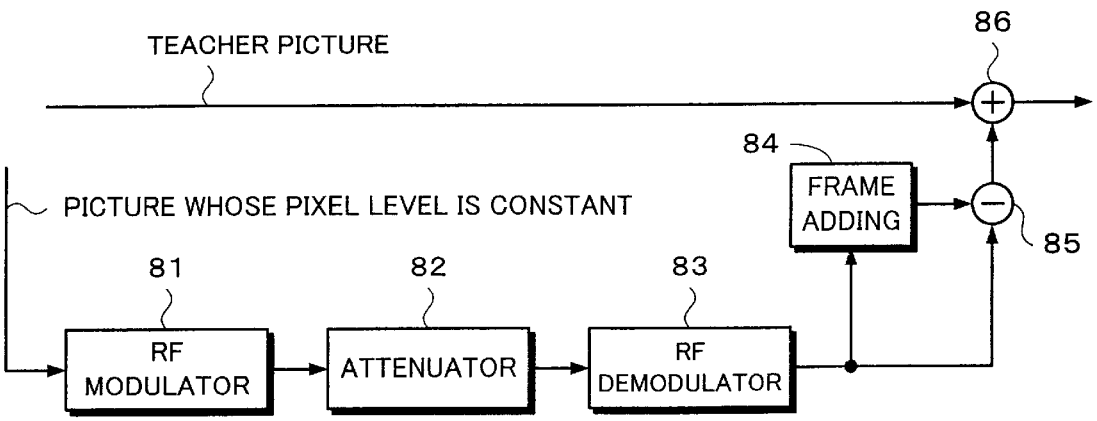
FIG. 8 is a block diagram showing another example of the structure for adding noise.

FIG. 8 shows an example of the structure according to the fourth method. In the fourth method, a picture whose pixel level is constant is supplied to an RF modulator 81. The RF modulator 81 RF-modulates the supplied picture. An output of the RF modulator 81 is supplied to an attenuator 82. The attenuator 82 attenuates the output of the RF modulator 81. An output of the attenuator 82 is supplied to an RF demodulator 83. The RF demodulator 83 RF-demodulates the output of the attenuator 82. An output of the RF demodulator 83 is supplied to a frame adding circuit 84 and a subtracter 85.

The frame adding circuit 84 adds frames of the supplied picture and generates a picture of which noise is eliminated with the output of the RF demodulator 83. An output of the frame adding circuit 84 is supplied to the subtracter 85. The subtracter 85 obtains the difference between the output of the RF demodulator 83 and the output of the frame adding circuit 84 so as to extract a noise component of the RF system. As an output of the subtracter 85, the extracted noise component is supplied to an adder 86. A teacher picture is also supplied to the adder 86. The adder 86 adds the output of the subtracter 85 to the teacher picture so as to generate a picture of which noise is added to the teacher picture.

Figure 9:
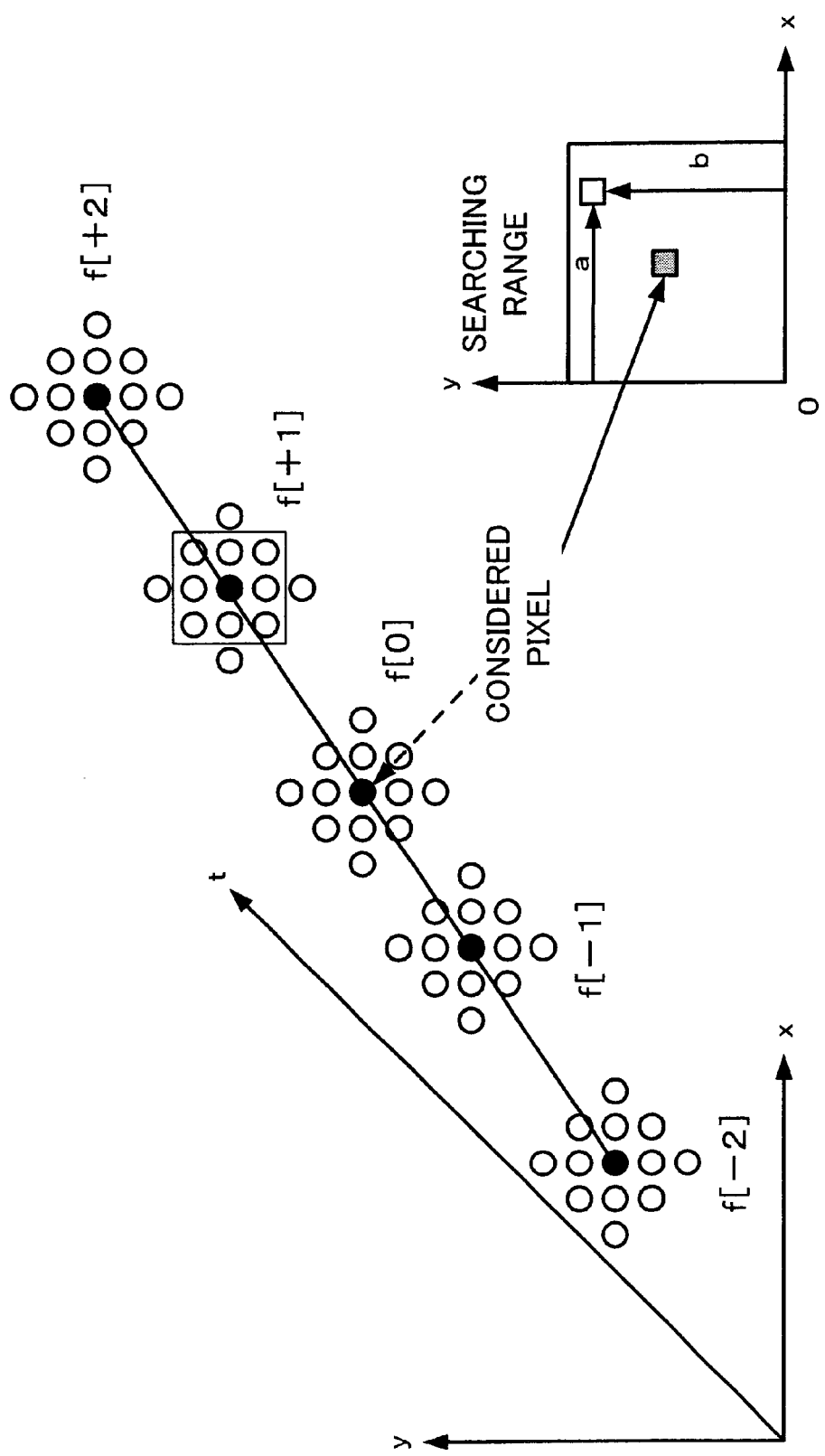
FIG. 9 is a schematic diagram for theoretically explaining the designation of tap positions according to the first embodiment of the present invention.

Next, a tap position determining method performed by the tap allocation designating portions 26 and 46 will be described in detail. Next, with reference to FIG. 9, the theory of the method will be described. Referring to FIG. 9, x, y, and t directions represent the horizontal direction, vertical direction, and time direction, respectively. In other words, as time elapses, frames f [−2], f [−1], f [0], f [+1], and f [+2] successively appear. To perform the method, it is necessary to satisfy the following preconditions.

(P) In a short time for around five frames, a picture moves almost as a linear uniform motion. The inventors of the present invention have confirmed that (P) is satisfied with a real picture.

(Q) When noise does not take place, the dispersion of pixels at the same spatial position of frames is 0 or almost 0.

According to the first embodiment of the present invention, several straight lines that pass through the frames f [−2] to f [+2] are designated. The dispersion of pixel values of the frames f [−2] to f [+2] on each straight line is calculated. Among those straight lines, a straight line of which the dispersion of pixel values is minimum is designated as a straight line that represents a motion.

In more reality, as shown in FIG. 9, an area of for example 5×5 pixels including a considered pixel at the center position thereof is designated on a considered frame f [0]. Hereinafter, the area is referred to as voting range. Each pixel is extracted from the voting range. Hereinafter, each pixel is referred to as voting pixel. The following process is performed for each voting pixel. In other words, a searching range is designated on for example a frame [+1] so that the searching range includes a voting pixel at the center position thereof. The searching range may be designated to another frame other than the frame f [+1]. In addition, each pixel of the frames f [−2] to f [+2] on each straight line that passes from each voting pixel to each pixel of the searching range (hereinafter referred to as searching pixel) is extracted. The dispersion of extracted pixels is calculated. A moving vector is calculated corresponding to a straight line of which the dispersion of pixel values is minimum. Since one straight line of which the dispersion of pixel values is minimum is obtained for each voting pixel, when voting pixels are designated in a pixel area of 5×5 pixels, 25 straight lines are designated. Among those straight lines, a straight line with the highest frequency is designated as a straight line that represents the motion of the considered pixel.

Figure 11A:
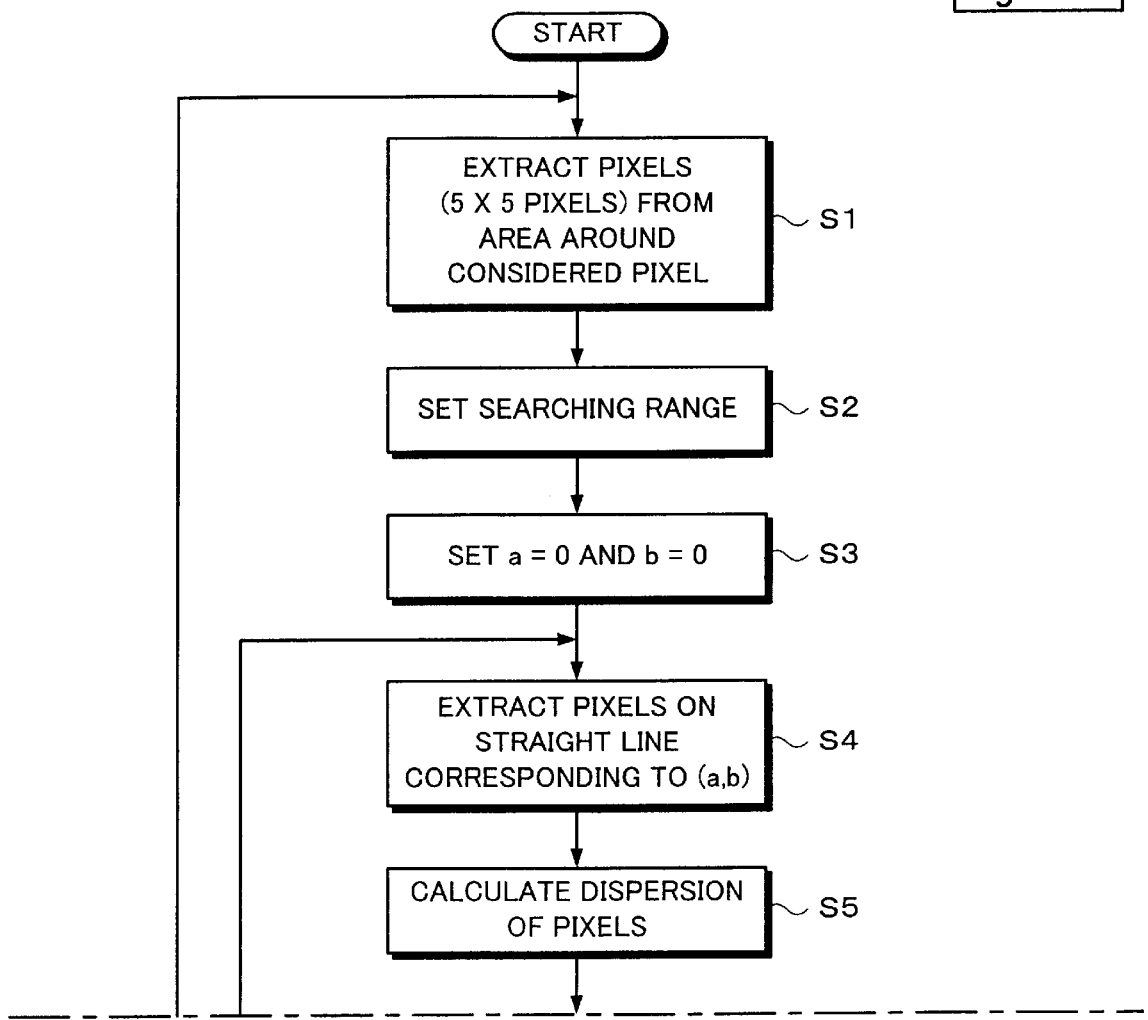
FIG. 11 is a flow chart for explaining a process for designating tap positions according to the first embodiment of the present invention.
Figure 11B:
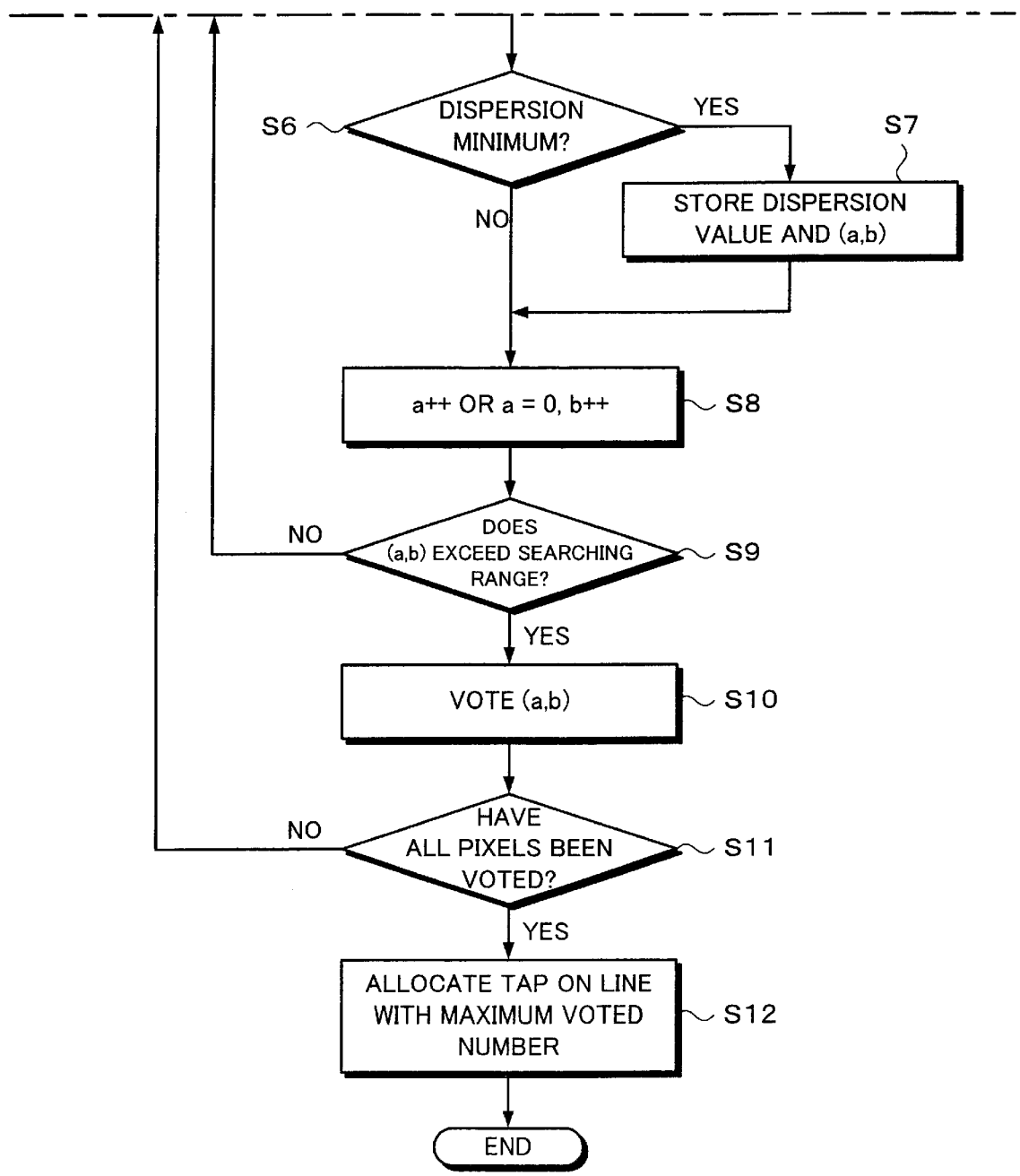

FIG. 11 shows an example of the process. At step S1, voting pixels are extracted from an area of for example 5×5 pixels around a considered pixel in a considered frame. At step S2, a searching range is designated on for example a frame f [1]. At step S3, parameters a and b that represent a position in the searching range are set to "0" (namely, the parameters a and b are initialized). In the example, as shown in FIG. 9, the parameters a and b represent the horizontal and vertical coordinates of the searching range. Alternatively, a position in the searching range can be represented in any coordinate system other than the orthogonal coordinate system. Whenever (a, b) are set, one straight line is defined. At step S4, each pixel of the frames f [−2] to f [+2] on a straight line defined by (a, b) is extracted.

At step S5, the dispersion of pixels on one straight line extracted at step S4 is calculated. The dispersion can be calculated by for example the following formula.

$$\text{dispersion} = \sum_{i=0}^{5} (m - ai)^2$$

where $$m = \frac{x_{-2} + x_{-1} + x_0 + x_1 + x_2}{5};$$

$X_{-2}, X_{-1}, X_0, X_1,$ and $X_2$ are pixel values; $x_0$ is a pixel value of a considered pixel; $x_{-1}$ is a pixel value of one frame earlier frame than the considered pixel; $x_{-2}$ is a pixel value of two frames earlier frame than the considered pixel; $x_1$ is a pixel value of one frame later frame than the considered pixel; $X_2$ is a pixel value of two frames later frame than the considered pixel; and $(m-a_i)$ may be used instead of $(m-a_i)^2$.

At step S6, it is determined whether or not the dispersion calculated at step S5 is minimum in the dispersions that have been calculated for other (a, b). When the determined result at step S6 is Yes (namely, the dispersion calculated at step S5 is minimum in those that have been calculated), the flow advances to step S7. Otherwise, the flow advances to step S8. At step S7, the dispersion value calculated at step S5 and (a, b) thereof are stored. Thereafter, the flow advances to step S8. At step S8, the values of (a, b) are updated.

When the parameters a and b are obtained as shown in FIG. 9, the values of the parameters a and b can be updated in the raster scanning sequence. At step S9, it is determined whether or not the updated values of the parameters a and b exceed the searching range that has been set at step S2. When the determined result at step S9 is Yes (namely, the updated values of the parameters a and b exceed the searching range), since the searching operation has been completed, the flow advances to step S10. Otherwise, the flow returns to step S4. At step S8, with the updated values of the parameters a and b, the process is performed.

At step S10, (a, b) that have been stored at step S7 and whose dispersion is minimum is voted. In the example, the voting operation represents a process for determining the frequency distribution of (a, b). At step S11, it is determined whether or not all pixels extracted as voting pixels at step S1 have been voted. When the determined result at step S11 is Yes (namely, all pixels have been voted), the flow advances to step S12. Otherwise, the flow returns to step S1. At step S1, a new pixel is extracted as a voting pixel. The process is performed for the extracted voting pixel.

At step S12, a class tap or a predictive tap of a frame is designated on a straight line with the maximum voted number (namely, the maximum frequency). In such a manner, taps that accurately represent a motion are allocated.

In the example, since (a, b) with the maximum voted number or the maximum frequency are designated, the values of (a, b) can be prevented or suppressed from being mistakenly determined due to noise. Thus, taps can be accurately allocated corresponding to a motion.

According to the first embodiment of the present invention, a moving vector of a moving picture is detected. With reference to the detected moving vector, noise can be more adequately eliminated. However, it should be noted that the present invention can be applied to a process for various picture signals whose motion should be accurately detected.

Figure 12:
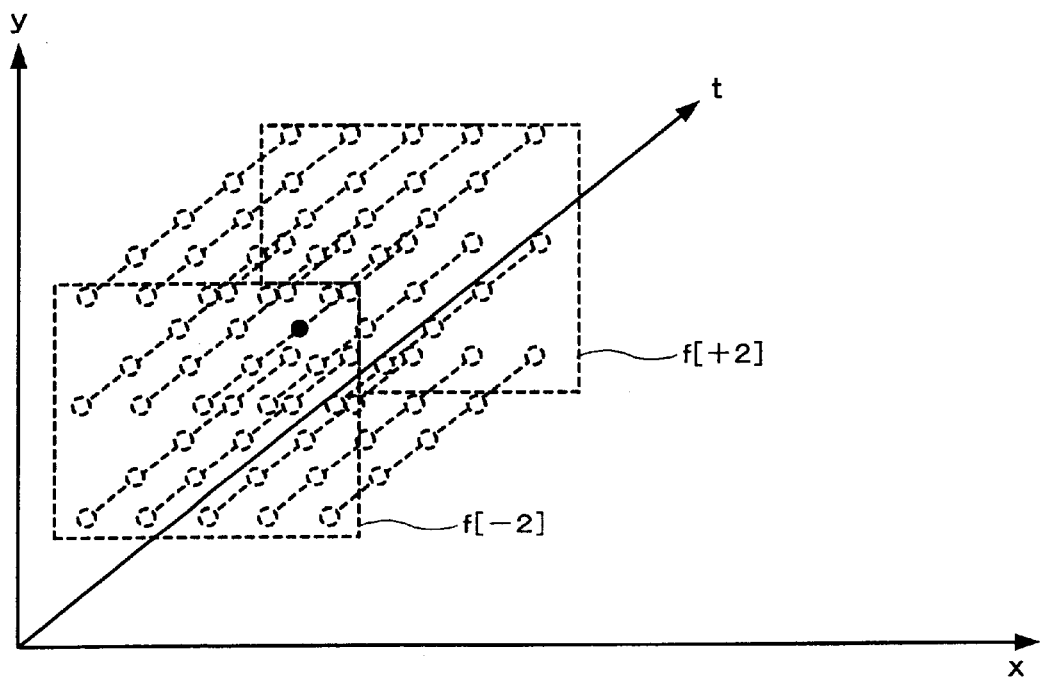
FIG. 12 is a schematic diagram for explaining an outline of each of a second embodiment, a third embodiment, a fourth embodiment, and a fifth embodiment of the present invention.

Next, with reference to FIG. 12, an outline of the moving vector detecting process according to each of a second embodiment, a third embodiment, a fourth embodiment, and a fifth embodiments will be described. Referring to FIG. 12, with a considered frame f [0] as a center frame, pixels of two earlier frames f [−1] and f [−2] and pixels of two later frames f [+1] and f [+2] are shown (each pixel is denoted by a circle). Referring to FIG. 12, the considered pixel is denoted by a black circle. To simplify the illustration, only the two frames f [−2] and f [+2] are denoted by dotted line rectangles.

According to the second embodiment and the third embodiment of the present invention, a voting range is designated around a considered pixel of a considered frame f [0]. A straight line of which the dispersion of pixel values of frames is minimum is selected from a plurality of straight lines that pass through voting pixels of the voting range. Straight line parameters with the maximum frequency are obtained as a locus of the motion of the considered pixel. As a result, a moving vector is calculated.

According to the fourth embodiment and the fifth embodiment of the present invention, an area is designated around a considered pixel of a considered frame f [0]. Hereinafter, the area is referred to as pipe range. A plurality of types of straight line groups each of which is composed of at least two parallel straight lines that pass through each pixel of the area are designated. Hereinafter, such a straight line group is referred to as pipe. Thus, a pipe is defined by straight line parameters that define parallel straight lines. A pipe of which the sum of the dispersions of pixels of the frames f [−2] to f [+2] is minimum is designated. With straight line parameters corresponding to the designated pipe, a moving vector is calculated.

Figure 13B:
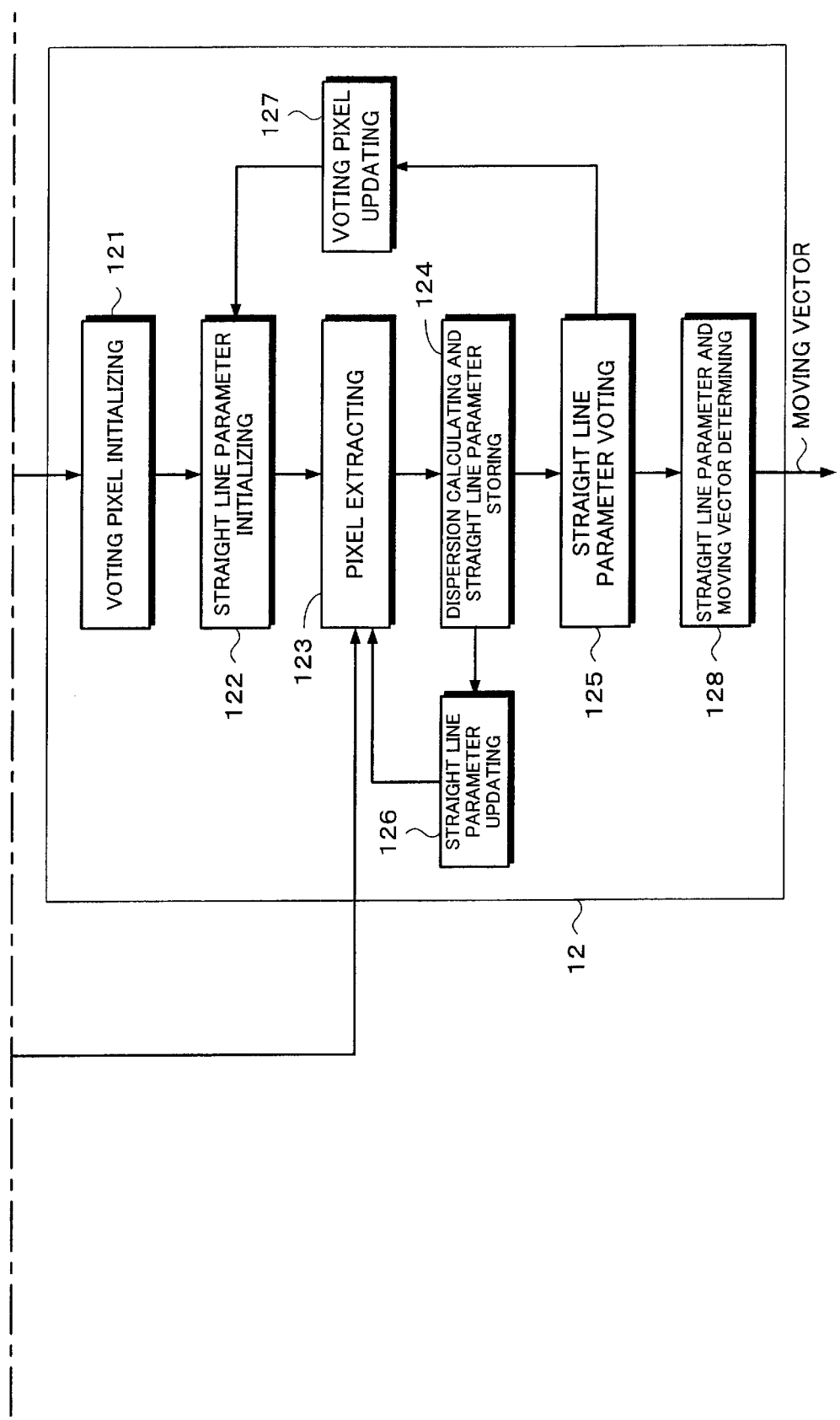
FIG. 13 is a block diagram for explaining the structure of the second embodiment of the present invention.

Next, the second embodiment of the present invention will be described in detail. FIG. 13 shows an example of the structure according to the second embodiment of the present invention. Referring to FIG. 13, an input picture signal is supplied to a frame memory portion 10. The frame memory portion 10 has five frame memories fm [−2], fm [−1], fm [0], fm [+1], and fm [+2] that are connected in a shift register shape. The frame memories fm [−2], fm [−1], fm [0], fm [+1], and fm [+2] store five successive frames f [−2], f [−1], f [0], f [+1], and f [+2] of the input picture signal, respectively.

Picture data of the considered frame f [0] is supplied from the frame memory fm [0] to an area extracting circuit 112 of a voting range designating portion 11. Picture data of the frames f [−2], f [−1], f [0], f [+1], and f [+2] are supplied from the frame memories fm [−2], fm [−1], fm [0], fm [+1], and fm [+2] to a pixel extracting circuit 123 of a moving vector calculating portion 12.

A voting range initializing circuit 111 designates an initial extracting area and supplies extracting area parameters that represent the designated initial extracting area to the area extracting circuit 112. The area extracting circuit 112 extracts an area corresponding to the supplied extracting area parameters from the picture data of the considered frame f [0].

Figure 14A:
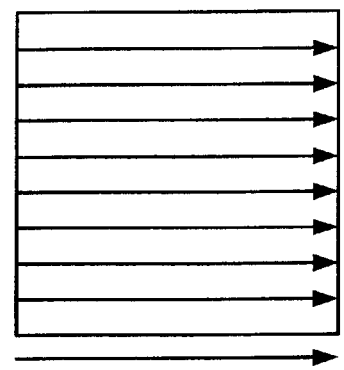
FIGS. 14A and 14B are schematic diagrams for explaining a process for designating a voting range.

The area extracting circuit 112 supplies pixel data of the extracted area to a horizontal direction DR calculating circuit 113 and a vertical direction DR calculating circuit 114. The horizontal direction DR calculating circuit 113 horizontally scans the supplied pixel data (see FIG. 14A) so as to calculate the DR (Dynamic Range) value of the pixel data in the horizontal direction (see FIG. 14A). The DR value is the difference between the maximum pixel value and the minimum pixel value of the pixel data. In addition, the horizontal direction DR calculating circuit 113 designates the maximum value from the calculated DR values in the horizontal direction and supplies the maximum value of the DR values in the horizontal direction to a voting range designating circuit 116.

Figure 14B:
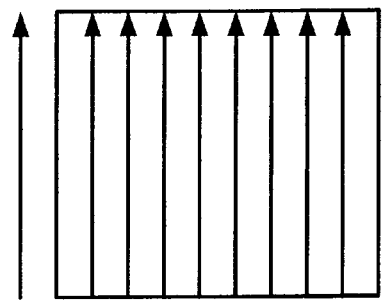

On the other hand, the vertical direction DR calculating circuit 114 vertically scans the supplied pixel data so as to calculate the DR in the vertical direction (see FIG. 14B). In addition, the vertical direction DR calculating circuit 114 designates the maximum value of the calculated DR values in the vertical direction and supplies the maximum value of the DR values in the vertical direction to the voting range designating circuit 116.

When the maximum horizontal DR value and the maximum vertical RD value exceed pre-designated threshold values, the voting range designating circuit 116 finally designates the extracted area as a voting range of a calculating process for detecting a moving vector.

On the other hand, when at least one of the maximum horizontal DR value and the minimum vertical DR value is equal to or smaller than the predetermined threshold values, the voting range designating circuit 116 supplies extracted area parameters that represent the extracted area to a voting range updating circuit 115. The voting range updating circuit 115 designates a new area corresponding to the supplied extracted area parameters and supplies the designated extracted area parameters to the area extracting circuit 112. The area extracting circuit 112 extracts a new area from the picture data of the considered frame f [0] corresponding to the supplied extracted area parameters.

Figure 15A:
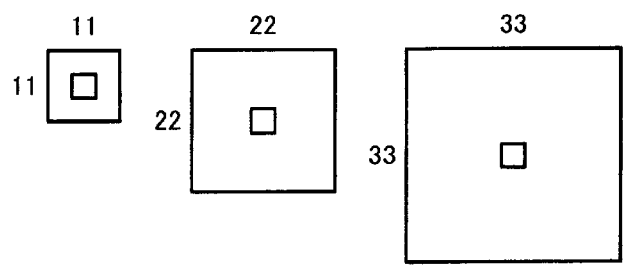
FIGS. 15A and 15B are schematic diagrams showing a designated voting range.

In the above-described structure and operation, until the maximum horizontal DR value and the maximum vertical DR value exceed the pre-designated threshold values, an area extracted as an alternative of the voting range is gradually widened from the initially designated area. Thus, the final voting range used in the calculating process for detecting a moving vector is designated. For example, as shown in FIG. 15A, the initially extracted area is a square area containing pixels 0 to 11 in each of the horizontal direction and the vertical direction. Thereafter, until the maximum horizontal DR value and the maximum vertical DR value exceed the threshold values, a square area containing pixels 0 to 22 in each of the horizontal direction and the vertical direction, a square area containing pixels 0 to 33 in each of the horizontal direction and the vertical direction, and so forth are successively extracted.

In the example, the size of the initially extracted area, the widening ratio of a newly extracted area, and the threshold values of the DR values can be freely designated. As a new area, besides an extracted area that is widened, an extracted area may be rotated or reduced.

Figure 15B:
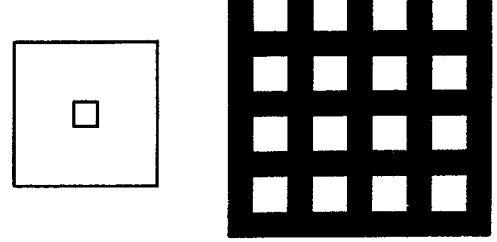

Alternatively, the density of pixels in an area extracted as a voting range may be varied. For example, as shown in FIG. 15B, when shaded pixels are excluded from the extracting range (for example, pixels are extracted at intervals of two pixels), even if the extracting area as a voting range widens, the total number of pixels in the area becomes constant.

In the above example, a voting range is designated by determining whether or not the maximum horizontal DR value and the minimum vertical DR value exceed predetermined threshold values. Alternatively, a voting range may be designated by determining whether or not the maximum DR value in the entire extracted area exceeds a predetermined threshold value. Alternatively, as a quantity that represents the activity of an extracted area, the dispersion of pixel values of the entire area may be calculated. Corresponding to the calculated result, a voting range may be designated corresponding to the calculated result. In reality, the process is performed until the calculated result becomes larger than a predetermined threshold value. The preceding area of the obtained area is designated as a voting range.

Parameters that represent a voting range designated by the voting range designating portion 11 are supplied from the voting range designating circuit 116 to a voting pixel initializing circuit 121 of the moving vector calculating portion 12. The voting pixel initializing circuit 121 initializes a voting pixel and supplies parameters that represent the initialized voting pixel position to a straight line parameter initializing circuit 122. The straight line parameter initializing circuit 122 initializes straight line parameters. The initialized straight line parameters are supplied to a pixel extracting circuit 123.

Figures 16, 17:
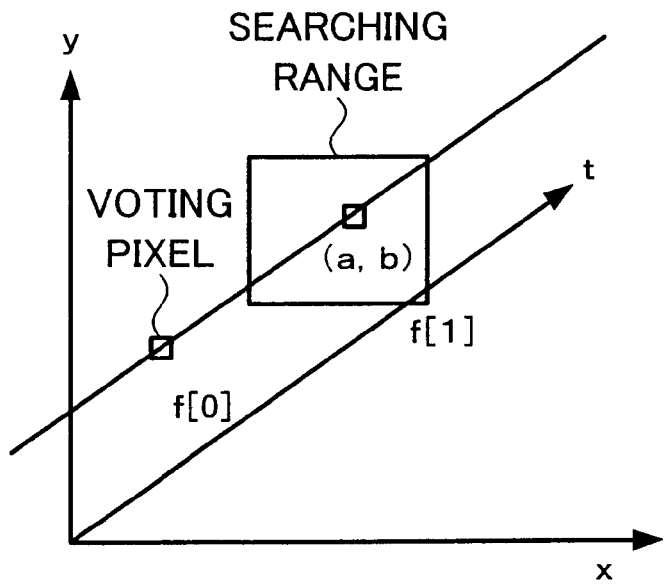
FIG. 16 is a schematic diagram for explaining straight line parameters.
FIG. 17 is a schematic diagram for explaining the locus of a moving vector calculated for each frame.

As is clear from FIG. 16, a straight line that passes through a particular voting pixel and a pixel in a frame f [+1] whose relative spatial pixel position against the voting pixel is (a, b) is uniquely defined in the (x, y, t) space. Thus, when a voting pixel is designated, straight line parameters can be represented as (a, b). In the real process, a searching range is designated in for example a frame f [+1]. Straight line parameters are represented with the position of a searching pixel in the searching range. Two straight lines whose straight line parameters are the same and whose voting pixels are different are in parallel each other.

Pixel data of the individual frames are supplied from the frame memories fm [−2] to fm [+2] to the pixel extracting circuit 123. The pixel extracting circuit 123 extracts pixel data of the individual frames on a straight line that is defined by straight line parameters (a, b). The extracted pixel data are supplied to a dispersion calculating and straight line parameter holding circuit 124.

The dispersion calculating and straight line parameter holding circuit 124 calculates the dispersion of five pixels corresponding to the supplied pixel data, compares the calculated results, and stores the calculated values and the straight line parameters thereof corresponding to the compared result. The dispersion calculating and straight line parameter holding circuit 124 supplies the finally held straight line parameters to a straight line parameter voting circuit 125. In addition, the dispersion calculating and straight line parameter holding circuit 124 supplies information of straight line parameters whose dispersion values have been calculated to a straight line parameter updating circuit 126. The straight line parameter updating circuit 126 designates straight line parameters that represent straight lines that have not been extracted by the pixel extracting circuit 123 and supplies the designated straight line parameters to the pixel extracting circuit 123.

As the results of the operations of the straight line parameter initializing circuit 122, the pixel extracting circuit 123, the dispersion calculating and straight line parameter holding circuit 124, and the straight line parameter updating circuit 126, the following process is performed. The dispersion values of pixels of individual frames on straight lines corresponding to straight line parameters represented by the pixel position (a, b) in the searching range are successively calculated from the initially designated straight line parameters. Among those, straight line parameters of which the dispersion value is minimum are supplied to the straight line parameter voting circuit 125.

Whenever straight line parameters are supplied to the straight line parameter voting circuit 125, the straight line parameter voting circuit 125 supplies information that represents the supplied straight line parameters to a voting pixel updating circuit 127. Whenever such information is supplied to the voting pixel updating circuit 127, the voting pixel updating circuit 127 updates the voting pixel. Information that represents the updated voting pixel is supplied to the straight line parameter initializing circuit 122. Corresponding to such information, the straight line parameter initializing circuit 122, the pixel extracting circuit 123, the dispersion calculating and straight line parameter holding circuit 124, and the straight line parameter updating circuit 126 perform the above-described processes. Thus, straight line parameters of which the dispersion of pixels of each frame on each straight line that passes through each voting pixel in the voting range is minimum are successively designated.

In the above-described processes, when straight line parameters corresponding to all the voting pixels in the voting range have been supplied, the straight line parameter voting circuit 125 detects the voted number (namely, the frequency) for the supplied straight line parameters. As a result, straight line parameters with the highest frequency are obtained as the locus of a moving vector of the considered pixel. When the obtained straight line parameters are denoted by $(a_0, b_0)$, the loci of the motions of the frames f [−2], f [−1], f [0], f [+1] and f [+2] are expressed as (−2×$a_0$, −2×$b_0$), (−$a_0$, −$b_0$), (0, 0), ($a_0$, $b_0$), and (2×$a_0$, 2×$b_0$), respectively (see FIG. 17).

According to the second embodiment, DR values in areas extracted as alternatives in a voting range are successively calculated. An area of which the calculated value exceeds a predetermined threshold value is obtained as a voting range. In addition, straight line parameters of which the dispersion of pixels of individual frames on a straight line that passes through each voting pixel becomes minimum are successively designated. A moving vector is calculated with the designated straight line parameters having the maximum frequency.

Alternatively, the DR value of each area extracted as an alternative in a voting range may be calculated in parallel. The calculated values may be compared. Corresponding to the compared result, a voting range may be designated. Alternatively, a voting range may be predetermined.

Alternatively, straight line parameters of which the dispersion of pixels of individual frames on a straight line that passes through each voting pixel is minimum are designated in parallel. Corresponding to straight line parameters having the highest frequency, a moving vector may be calculated.

Figure 18B:
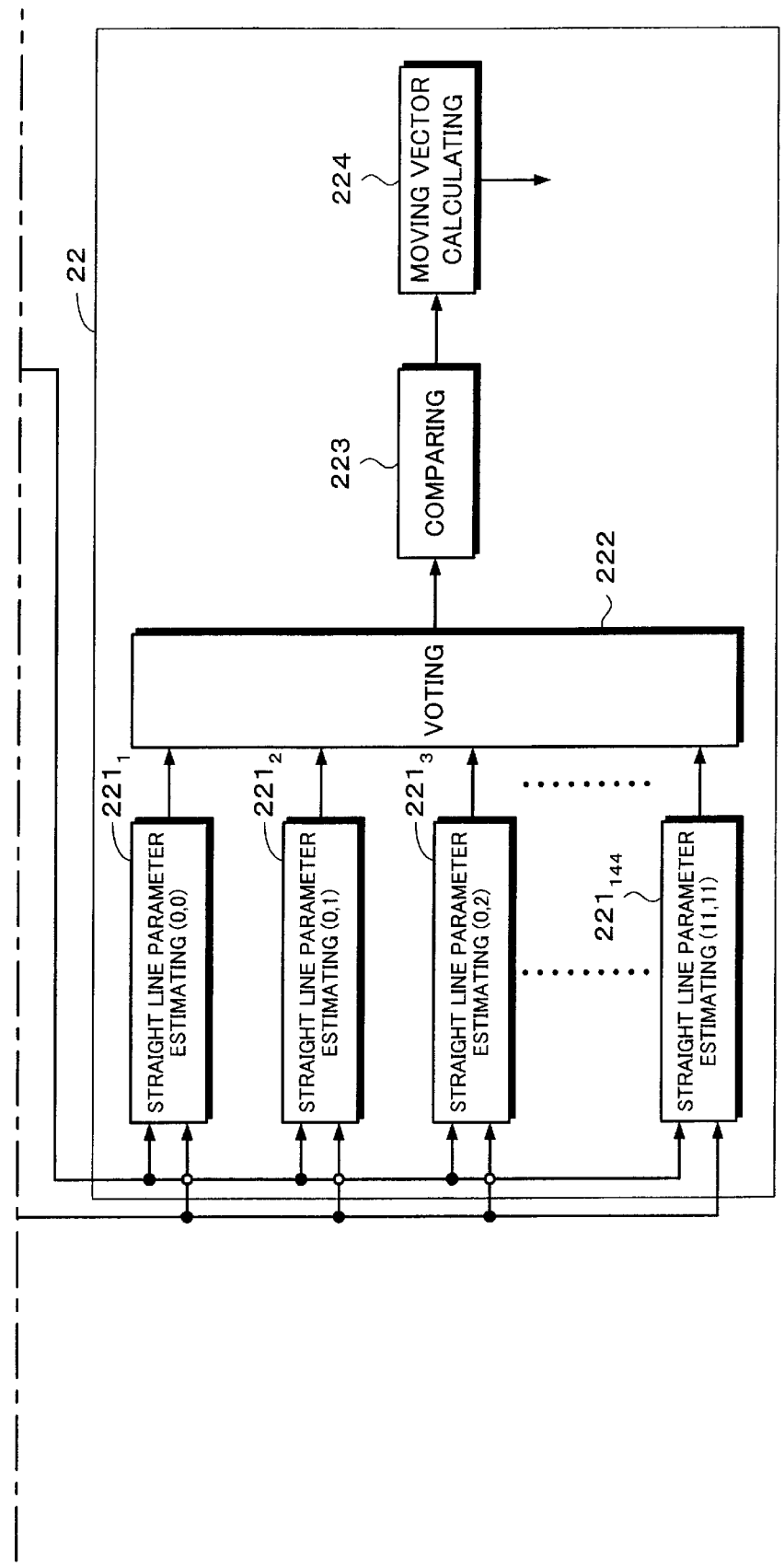
FIG. 18 is a block diagram for explaining the structure of the third embodiment of the present invention.

From the above-described point of view, the third embodiment of the present invention can be accomplished. FIG. 18 shows an example of the structure of the third embodiment of the present invention. Referring to FIG. 18, an input picture signal is supplied to a frame memory portion 10. The structure and operation of the frame memory portion 10 are the same as those of the frame memory portion 10 shown in FIG. 13. Thus, for simplicity, the redundant description is omitted. Picture data of a considered frame f [0] is supplied from a frame memory fm [0] to area extracting circuits $212_1$, $212_2$, . . . , and $212_{19}$ of a voting range designating portion 21. In addition, picture data of frames f [−2] to f [+2] are supplied from frame memories fm [−2] to fm [+2] to straight line parameter estimating circuits $221_1$, $221_2$, . . . , and $221_{144}$ of a moving vector calculating portion 22.

The area extracting circuits $212_1$, $212_2$, . . . , and $212_{19}$ extract a square area containing pixels 0 to 11 in each of the horizontal direction and the vertical direction, a square area containing pixels 0 to 22 in each of the horizontal direction and the vertical direction, . . . , and a square area containing pixels 0 to 209 (=11×19) in each of the horizontal direction and the vertical direction from the picture data of the considered frame f [0]. The picture data that are extracted by the area extracting circuits $212_1$, $212_2$, . . . , and $212_{19}$ are supplied to horizontal DR calculating circuits $213_1$, $213_2$, . . . , and $213_{19}$ and vertical DR calculating circuits $214_1$, $214_2$, . . . , and $214_{19}$, respectively.

The horizontal DR calculating circuit $213_1$, $213_2$, . . . , and $213_{19}$ and the vertical DR calculating circuits $214_1$, $214_2$, . . . , and $214_{19}$ calculate horizontal DR values and vertical DR values corresponding to the supplied picture data and supply the calculated values to a comparing circuit 215. The comparing circuit 215 compares the supplied calculated values and designates a voting range corresponding to the compared result.

The size of an area extracted as an alternative in a voting range, the threshold values of the DR values, and so forth can be freely designated. In addition, as was described with reference to FIG. 15B, the density of pixels in an extracted area may be varied.

In the above-described example, a voting range is designated corresponding to horizontal DR values and vertical DR values of an extracted area. Alternatively, the DR value of the entire extracted area, the dispersion of pixel values of an extracted area, and so forth may be calculated. Corresponding to the calculated results, a voting range may be designated.

Next, the case of which an area containing pixels 0 to 11 in each of the horizontal direction and the vertical direction is designated as a voting range will be described. In the case, the number of voting pixels is 12×12=144 of (0, 0), (0, 1), . . . , and (11, 11). Corresponding to the individual voting pixels, a moving vector calculating portion 22 has straight line parameter estimating circuits $221_1$, $221_2$, . . . , and $221_{144}$. Parameters that represent a voting range designated by the voting range designating portion 21 are supplied to 144 straight line parameter estimating circuits $221_1$, $221_2$, . . . , and $221_{144}$ of the moving vector calculating portion 22.

The straight line parameter estimating circuits $221_1$, $221_2$, . . . , and $221_{144}$ estimate straight line parameters of which the dispersion of pixel values of the frames f [−2] to f [+2] on straight lines that pass through pixels in the voting range is minimum. The estimated straight line parameters are supplied to a voting circuit 222.

The voting circuit 222 calculates the frequency of the supplied straight line parameters and generates frequency data. The frequency data is supplied to a comparing circuit 223. The comparing circuit 223 designates straight line parameters having the highest frequency corresponding to the supplied frequency data. A moving vector calculating circuit 224 calculates a moving vector corresponding to the straight line parameters designated by the comparing circuit 223.

Figure 19:
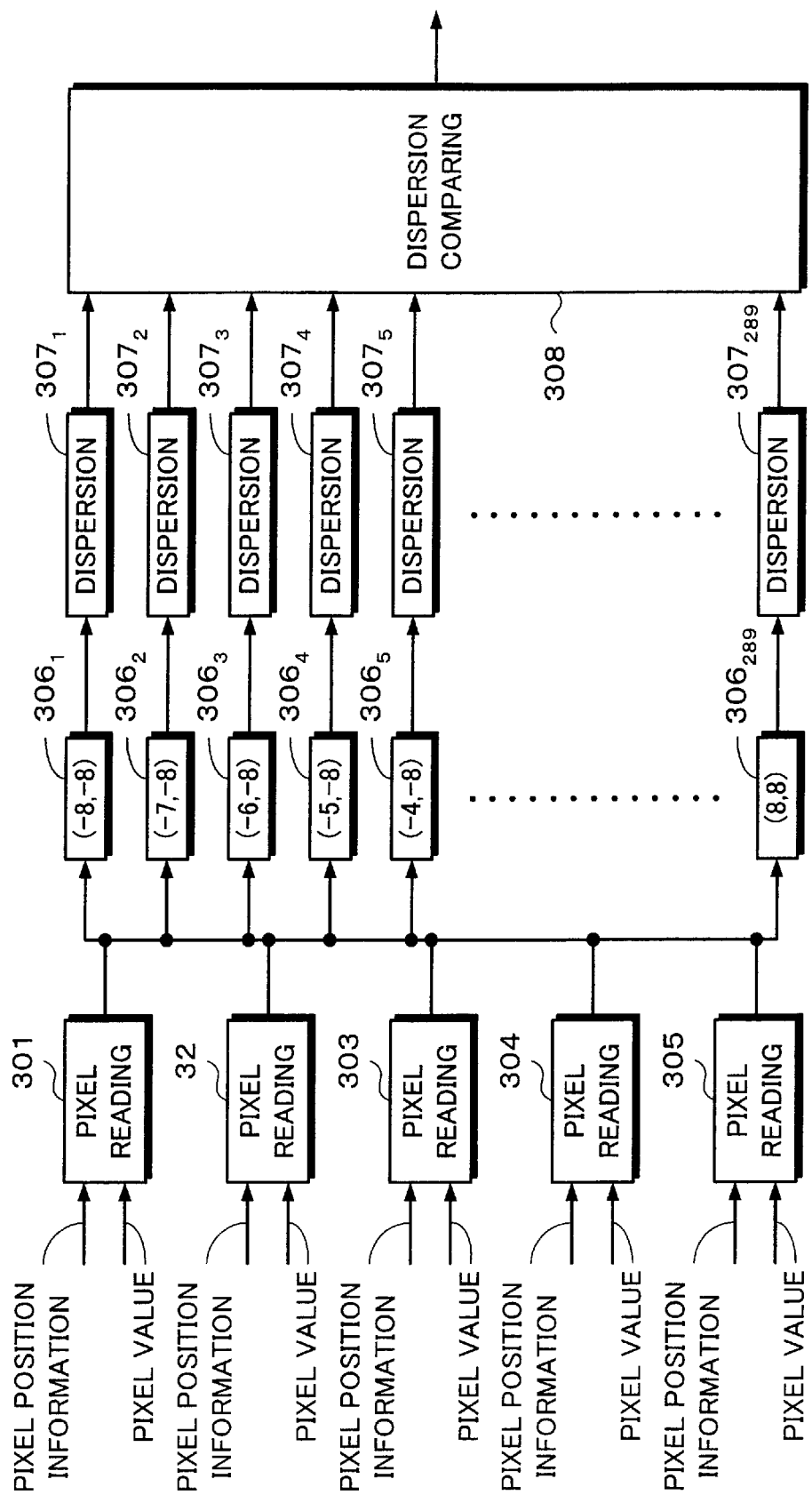
FIG. 19 is a block diagram for explaining the structure of a portion of the third embodiment of the present invention.

FIG. 19 shows an example of the structure of each of the straight line parameter estimating circuits $221_1$, $221_2$, ..., and $221_{144}$. Pixel position information representing a voting range is supplied from the voting range designating portion 21 to pixel reading circuits 301, 302, 303, 304, and 305. The pixel reading circuits 301 to 305 read pixel data corresponding to the supplied pixel position information from the frame memories fm [−2] to fm [+2], respectively. In the example, searching pixels are 289 pixels at relative pixel positions (−8, −8), (−7, −8), ..., and (8, 8) corresponding to the voting pixel positions.

Pixel extracting circuits $306_1$, $306_2$, ..., and $306_{289}$ extract pixels of the individual frames on straight lines at the searching pixel positions (−8, −8), (−7, 7), ..., and (8, 8) and supply the extracted pixel data to dispersion calculating circuits $307_1$, $307_2$, ..., and $307_{289}$.

The dispersion calculating circuits $307_1$, $307_2$, ..., and $307_{289}$ calculate the dispersions of the supplied pixel data and supply the calculated values to a dispersion comparing circuit 308. The dispersion comparing circuit 308 compares the calculated dispersion values, designates the minimum dispersion value, and outputs straight line parameters at the input position corresponding to the designated dispersion value.

In the above example, the case of which an area containing pixels 0 to 11 in each of the horizontal direction and the vertical direction is designated as a voting range was described. Alternatively, more straight line parameter estimating circuits may be disposed so that an area containing more pixels can be designated as a voting range. Alternatively, a straight line parameter estimating circuit may be operated on time division basis.

In the example shown in FIG. 19, an area containing a total of 289 pixels of (17×17) pixels is designated as a searching range. However, it should be noted that the searching range is not limited to such an area. Instead, the searching range can be freely designated.

According to the second embodiment and the third embodiment of the present invention, pixels of individual frames on a straight line that passes through each pixel in a voting range are extracted. Straight line parameters of a straight line of which the dispersion of extracted pixel data is minimum are voted. Alternatively, the sum of the absolute values of the differences of the average value of the extracted pixel data and each pixel value may be calculated. The minimum calculated value may be voted for straight line parameters. Alternatively, the minimum value of the sum of the absolute values of the differences of adjacent pixels of the extracted pixel data may be voted as straight line parameters.

Figure 20:
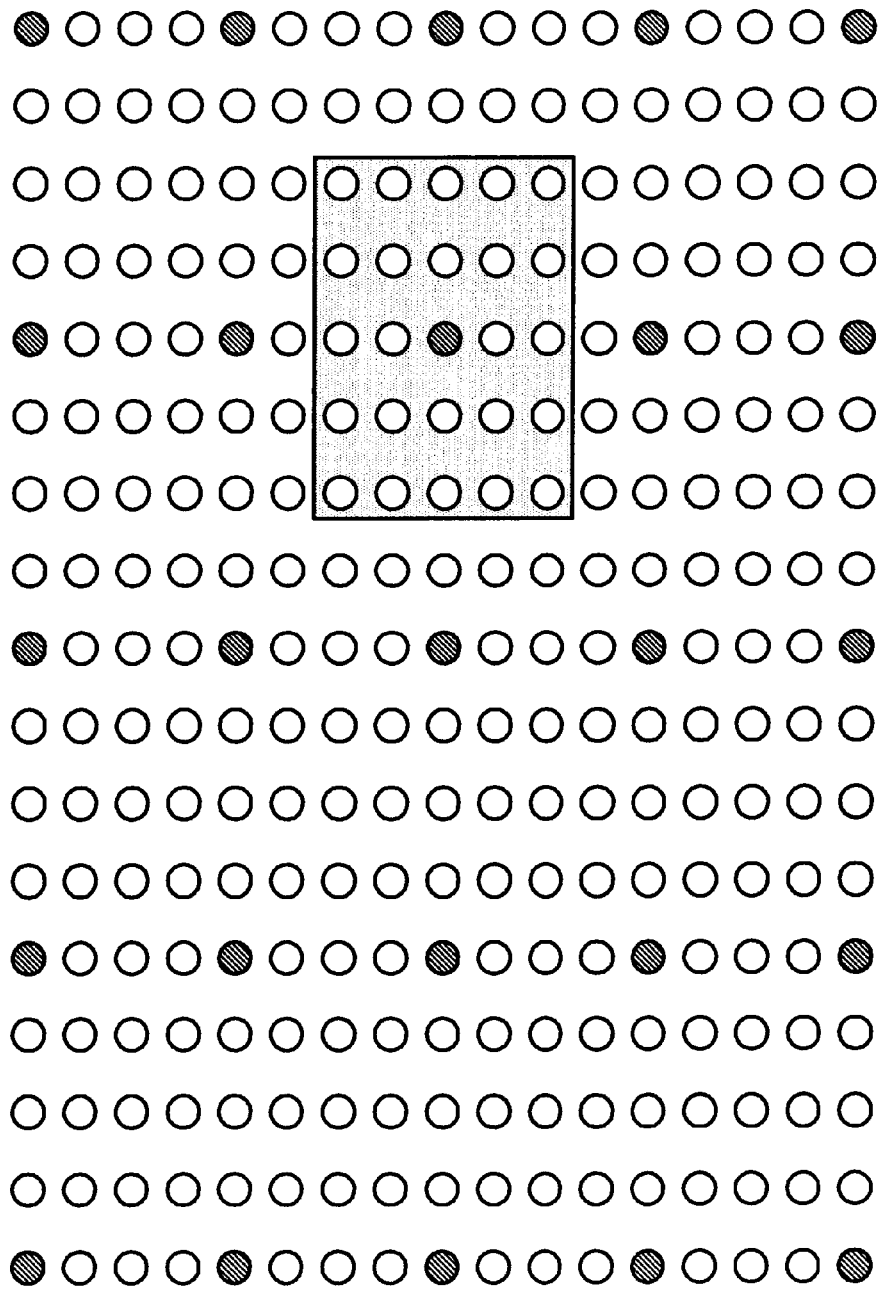
FIG. 20 is a schematic diagram for explaining an example of a hierarchical searching process.

Alternatively, in a process for treating a part of pixels in a searching range, straight line parameters may be coarsely estimated. Using the estimated results, the vicinity of each estimated portion may be searched in detail. In other words, a hierarchical searching process may be performed. Next, with reference to FIGS. 20 and 21, such a hierarchical searching process will be described. Referring to FIG. 20, a searching range contains 17 pixels in each of the horizontal direction and the vertical direction (namely, a total of 289 pixels). When straight line parameters are coarsely estimated, shaded pixels at intervals of three pixels (a total of 25 pixels) are treated as searching pixels. In other words, the dispersion of pixels of for example five frames on a straight line that passes through each of 25 pixels and each voting pixel are calculated. A searching pixel of which the calculated result is minimum is selected as a coarsely estimated result.

Five pixels in each of the horizontal direction and the vertical direction (namely, a total of 25 pixels) including the selected pixel at the center position as the coarsely estimated result are treated as searching pixels. In other words, the dispersion of pixel values of pixels of for example five frames on a straight line that passes through each searching pixel and each voting pixel is calculated. Straight line parameters that are voted are finally designated corresponding to the pixel position of a searching pixel whose calculated value is minimum.

Figure 21:
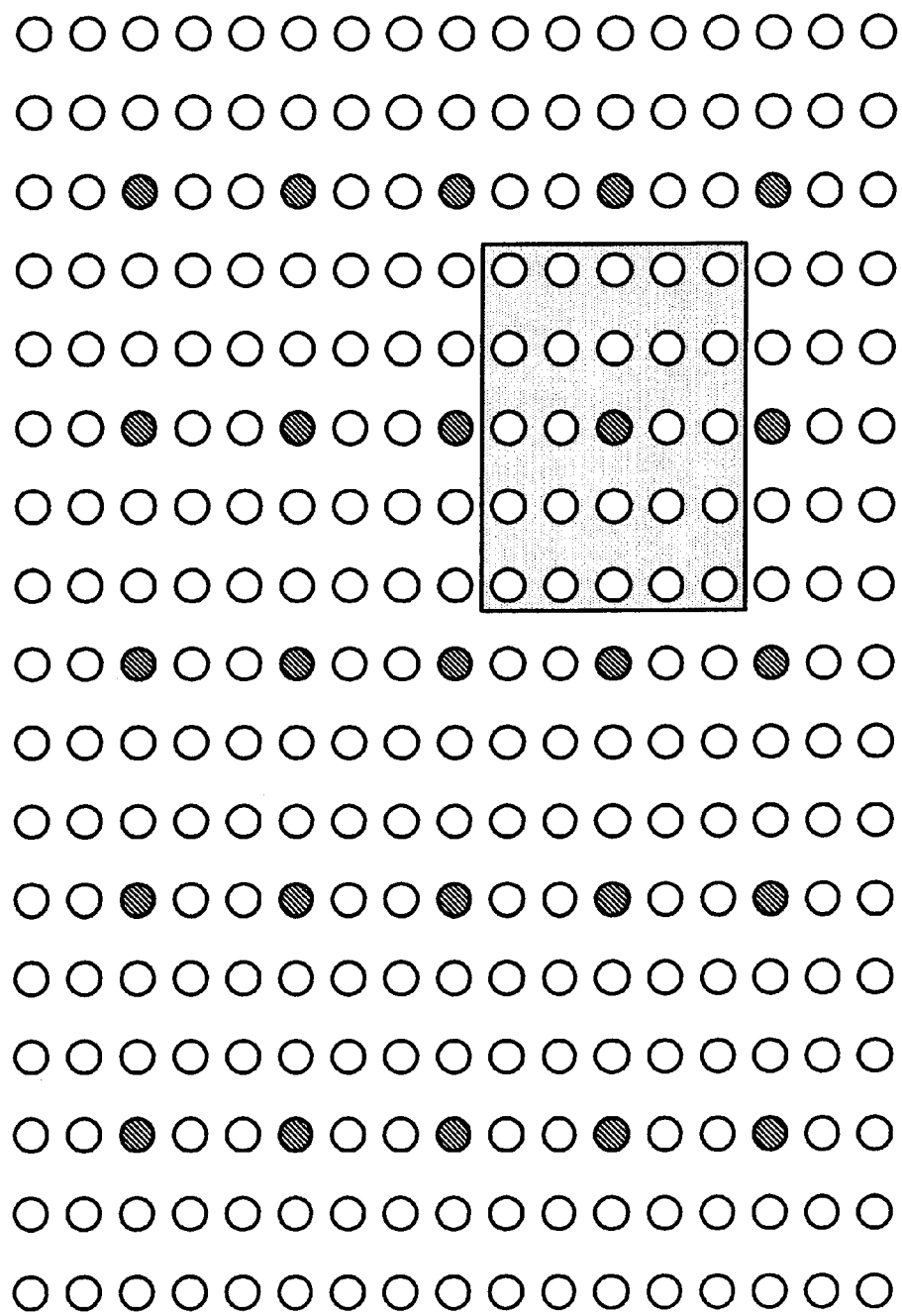
FIG. 21 is a schematic diagram for explaining another example of the hierarchical searching process.

In another example shown in FIG. 21, a searching range contains 17 pixels in each of the horizontal direction and the vertical direction (namely, a total of 289 pixels). When straight line parameters are coarsely estimated, pixels at intervals of two pixels (namely, a total of 25 pixels) are treated as searching pixels denoted as shaded pixels. In a range (denoted as a square) containing five pixels in each of the horizontal direction and the vertical direction (namely, a total of 25 pixels) including the selected pixel at the center position thereof as the coarsely estimated result, all the pixels are treated as searching pixels. As a result, straight line parameters that are voted are finally designated.

When the hierarchical searching process described with reference to FIGS. 20 and 21 is performed, a dispersion is calculated corresponding to for example 25 pixel positions in a searching range and the calculated values are compared. Thus, straight line parameters that are voted can be selected. As a result, the structure for calculating a dispersion and so forth can be suppressed from becoming large.

Next, the fourth embodiment of the present invention will be described. As was described above, according to the fourth embodiment of the present invention, the motion of a moving picture is treated as a pipe instead of a straight line so as to detect a moving vector. In other words, according to the fourth embodiment of the present invention, instead of a space-time straight line, the dispersion of a plane of which a straight line is widened in the spatial direction is calculated. As a result, a moving vector can be accurately calculated without an influence of noise.

Figure 22B:
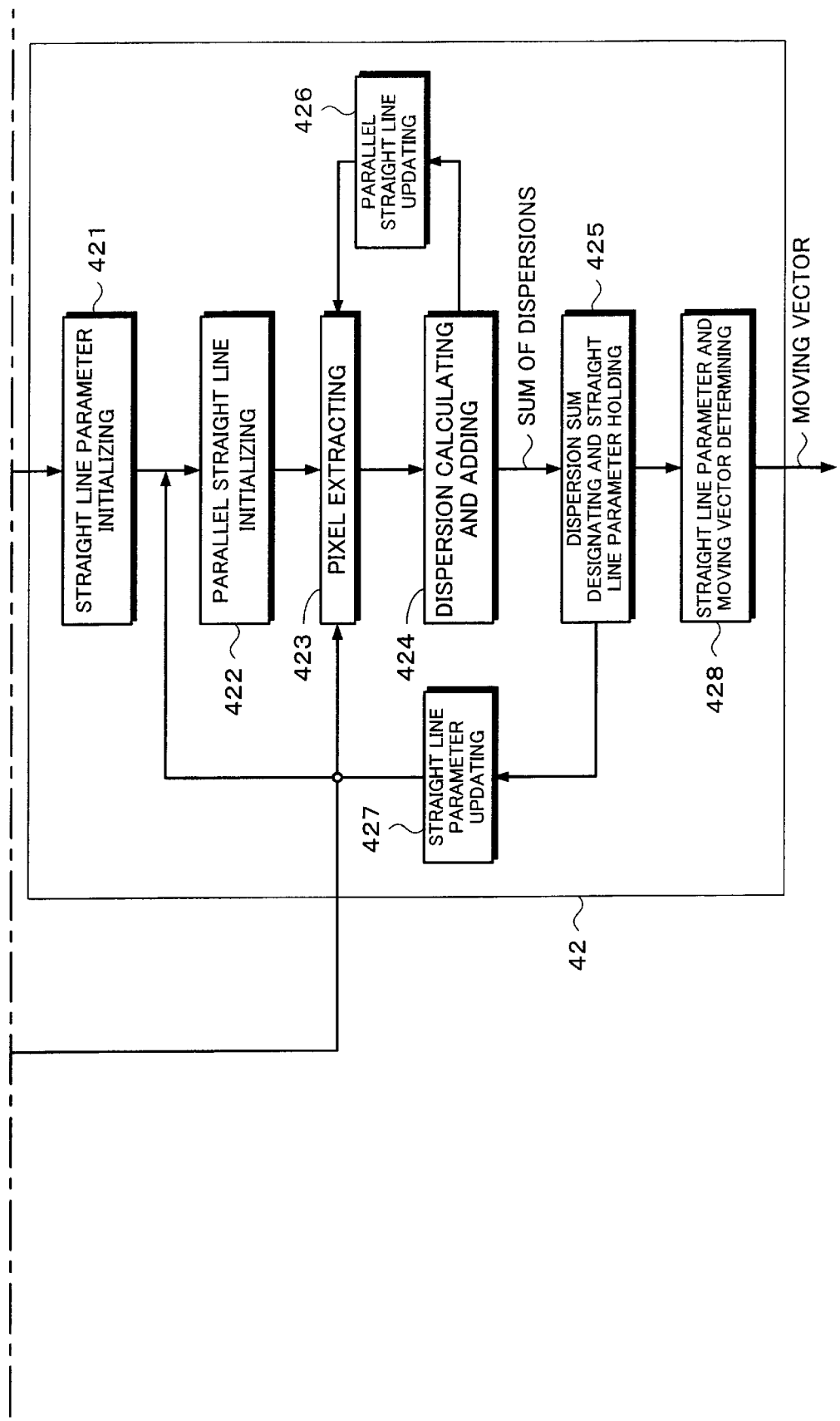
FIG. 22 is a block diagram for explaining the structure of the fourth embodiment of the present invention.

FIG. 22 shows an example of the structure of the fourth embodiment. Referring to FIG. 22, an input picture is supplied to a frame memory portion 10. Since the structure and operation of the frame memory portion 10 are the same as those of the frame memory portion 10 shown in FIG. 13, for simplicity, redundant description is omitted. Picture data of a considered frame f [0] is supplied from a frame memory fm [0] to a pipe extracting circuit 412 of a pipe range designating portion 41. Picture data of frames f [−2] to f [+2] are supplied from frame memories fm [−2] to fm [+2] to a straight line pixel extracting circuit 423 of a moving vector calculating portion 42.

A pipe range initializing circuit 411 initializes a pipe range and supplies parameters that represent the initialized pipe range to the pipe extracting circuit 412. The pipe extracting circuit 412 extracts an area from the picture data of the considered frame f [0] corresponding to the supplied parameters.

Picture data of the extracted area is supplied to a horizontal direction DR calculating circuit 413 and a vertical direction DR calculating circuit 414. The horizontal direction DR calculating circuit 413 horizontally scans the supplied pixel data so as to successively calculate DR values in the horizontal direction. In addition, the horizontal direction DR calculating circuit 413 designates the maximum horizontal DR value and supplies the designated maximum horizontal DR value to a pipe range designating circuit 416.

Likewise, the vertical direction DR calculating circuit 414 vertically scans the supplied pixel data so as to successively calculate DR values in the vertical direction. In addition, the vertical direction DR calculating circuit 414 designates the maximum vertical DR value and supplies the designated maximum vertical DR value to the pipe range designating circuit 416. When the supplied maximum horizontal DR value and vertical maximum DR value exceed predetermined threshold values, the pipe range designating circuit 416 finally designates that the current pipe range is used for calculating a moving vector.

On the other hand, when at least one of the supplied maximum horizontal DR value and maximum vertical DR value is equal to or smaller than the predetermined threshold values, the pipe range designating circuit 416 supplies parameters that represents the current pipe range to a pipe range updating circuit 415. Corresponding to the supplied parameters, the pipe range updating circuit 415 generates parameters for extracting a new area and supplies the generated parameters to the pipe extracting circuit 412. The pipe extracting circuit 412 extracts a new area from the picture data of the considered frame f [0].

In the above-described structure and operation, as was described with reference to FIG. 15A, until the maximum horizontal DR value and maximum vertical DR value exceed the predetermined threshold values, an area extracted as an alternative in a pipe range is gradually widened from the initialized area. As a result, a pipe range used for calculating a moving vector is finally designated.

The size of the initially extracted area, the widening ratio of the area that is newly extracted, and the threshold values of the DR values can be freely designated. In addition, the size of an area extracted as a pipe range, the threshold values of the DR values thereof, and so forth can be freely designated. As a new area, an extracted area may be rotated or reduced.

In addition, as was described with reference to FIG. 15B, the density of pixels in an extracted area as an alternative in a pipe range may be varied.

In the above example, a pipe range was designated corresponding to the horizontal and vertical DR values of an extracted area. Alternatively, the DR value of all pixels of an extracted area, the dispersion of pixels of the entirely extracted area, and so forth may be calculated. Corresponding to the calculated result, a pipe range may be designated.

Parameters that represent a pipe range designated by the pipe range designating portion 41 are supplied from the pipe range designating circuit 416 to a straight line parameter initializing circuit 421 of the moving vector calculating portion 42. The straight line parameter initializing circuit 421 initializes the straight line parameters and supplies the initialized straight line parameters to a parallel straight line initializing circuit 422. As a result, a pipe as a set of parallel straight lines that pass through individual pixels in the pipe range in the x-y-t space is designated corresponding to the straight line parameters. The parallel straight line initializing circuit 422 generates parameters that designate one of parallel straight lines that compose the pipe as an initialized straight line and supplies the generated parameters to the pixel extracting circuit 423.

In addition, picture data of the frames f [−2] to f [+2] are supplied to the pixel extracting circuit 423. The pixel extracting circuit 423 extracts pixels of the individual frames on the initialized straight line. Pixel data of the extracted pixels are supplied to a dispersion calculating and adding circuit 424.

The dispersion calculating and adding circuit 424 calculates the dispersion of the supplied pixel data and the sum of the calculated value. Whenever the dispersion calculating and adding circuit 424 calculates the dispersion and the sum, the dispersion calculating and adding circuit 424 supplies relevant information to a parallel straight line updating circuit 426.

The parallel straight line updating circuit 426 generates parameters that represent a straight line that has not been used for extracting a pixel by the moving vector calculating portion 42 from the parallel lines that compose the pipe and supplies the generated parameters to the pixel extracting circuit 423. The pixel extracting circuit 423 extracts pixel data of pixels of the individual frames on a straight line corresponding to the supplied parameters and supplies the extracted pixel data to the dispersion calculating and adding circuit 424.

As the results of the operations of the straight line parameter initializing circuit 421, the parallel straight line initializing circuit 422, the pixel extracting circuit 423, the dispersion calculating and adding circuit 424, and the parallel straight line updating circuit 426, the following process is performed. In other words, the dispersion of pixel values of pixels of the individual frames on each straight line of the pipe is successively calculated from the initialized straight line. The calculated values are added the sum of the dispersions is calculated. The sum of the dispersions is supplied to a dispersion sum designating and straight line parameter holding circuit 425.

Whenever the sum of dispersions is supplied to the dispersion sum designating and straight line parameter holding circuit 425, it supplies resultant information to a straight line parameter updating circuit 427. In addition, the dispersion sum designating and straight line parameter holding circuit 425 designates the supplied sum of the dispersions and holds the straight line parameters corresponding to the designated results.

A straight line parameter updating circuit 427 newly designates straight line parameters of a pipe that has not been designated corresponding to the supplied information and supplies the designated straight line parameters to the parallel straight line initializing circuit 422. Corresponding to the straight line parameters, the pixel extracting circuit 423, the dispersion calculating and adding circuit 424, and the parallel straight line updating circuit 426 perform the above-described process. In such a manner, the sum of dispersions of pixels of individual frames on each straight line of each pipe corresponding to straight line parameters is successively calculated. The straight line parameters are designated corresponding to the sum of the calculated dispersions.

The dispersion sum designating and straight line parameter holding circuit 425 performs the following process so as to designate the straight line parameters corresponding to the sum of dispersions. First of all, the dispersion sum designating and straight line parameter holding circuit 425 holds the sum of dispersions of a pipe corresponding to the initialized straight line parameters. In addition, the dispersion sum designating and straight line parameter holding circuit 425 holds the initialized straight line parameters.

Thereafter, the sum of dispersions of a pipe corresponding to straight line parameters that are supplied from the dispersion calculating and adding circuit 424 and are designated by the straight line parameter updating circuit 427 second time are compared with the sum of dispersions of a pipe corresponding to the initialized straight line parameters. The dispersion sum designating and straight line parameter holding circuit 425 holds the smaller value of the sum of dispersions. In addition, the dispersion sum designating and straight line parameter holding circuit 425 holds straight line parameters corresponding to the smaller value of the sum of dispersions.

Thereafter, the sum of dispersions of pipes corresponding to straight line parameters that are supplied from the dispersion calculating and adding circuit 424 and are designated by the straight line parameter updating circuit 427 third time, fourth time, and so forth are compared with the sum of dispersions that are currently held. The dispersion sum designating and straight line parameter holding circuit 425 holds a smaller value of the sum of dispersions. In addition, the dispersion sum designating and straight line parameter holding circuit 425 holds the straight line parameters corresponding to the smaller value of the sum of dispersions.

Such a process is performed for each pipe corresponding to straight line parameters designated by the parallel straight line initializing circuit 422 and the straight line parameter updating circuit 427. As a result, the minimum dispersion is designated as the sum of dispersions that is finally held. The straight line parameters corresponding to the minimum value of the sum of dispersions are output to a moving vector calculating circuit 428. The moving vector calculating circuit 428 calculates a moving vector corresponding to the supplied straight line parameters.

As was described above, according to the fourth embodiment of the present invention, the DR value of each area extracted as an alternative in a pipe range is successively calculated. An area of which the calculated value exceeds a threshold value is designated as a pipe range. The sum of dispersions of pixels of individual frames on each parallel straight line of a pipe corresponding to straight line parameters is successively calculated. A pipe of which the calculated value is minimum is designated. Corresponding to straight line parameters of the designated pipe, a moving vector of each pixel on the straight line is calculated.

Alternatively, DR values of individual areas extracted as alternatives in a pipe range may be calculated in parallel. The calculated values may be compared. Corresponding to the compared result, a pipe range may be designated.

In addition, the sum of dispersions of pixel values of pixels of individual frames on each parallel line of a pipe corresponding to straight line parameters may be calculated in parallel. The calculated values are compared. As a result, a pipe of which the sum of dispersions is minimum is designated. Corresponding to the straight line parameters of the designated pipe, a moving vector may be calculated.

Figure 23B:
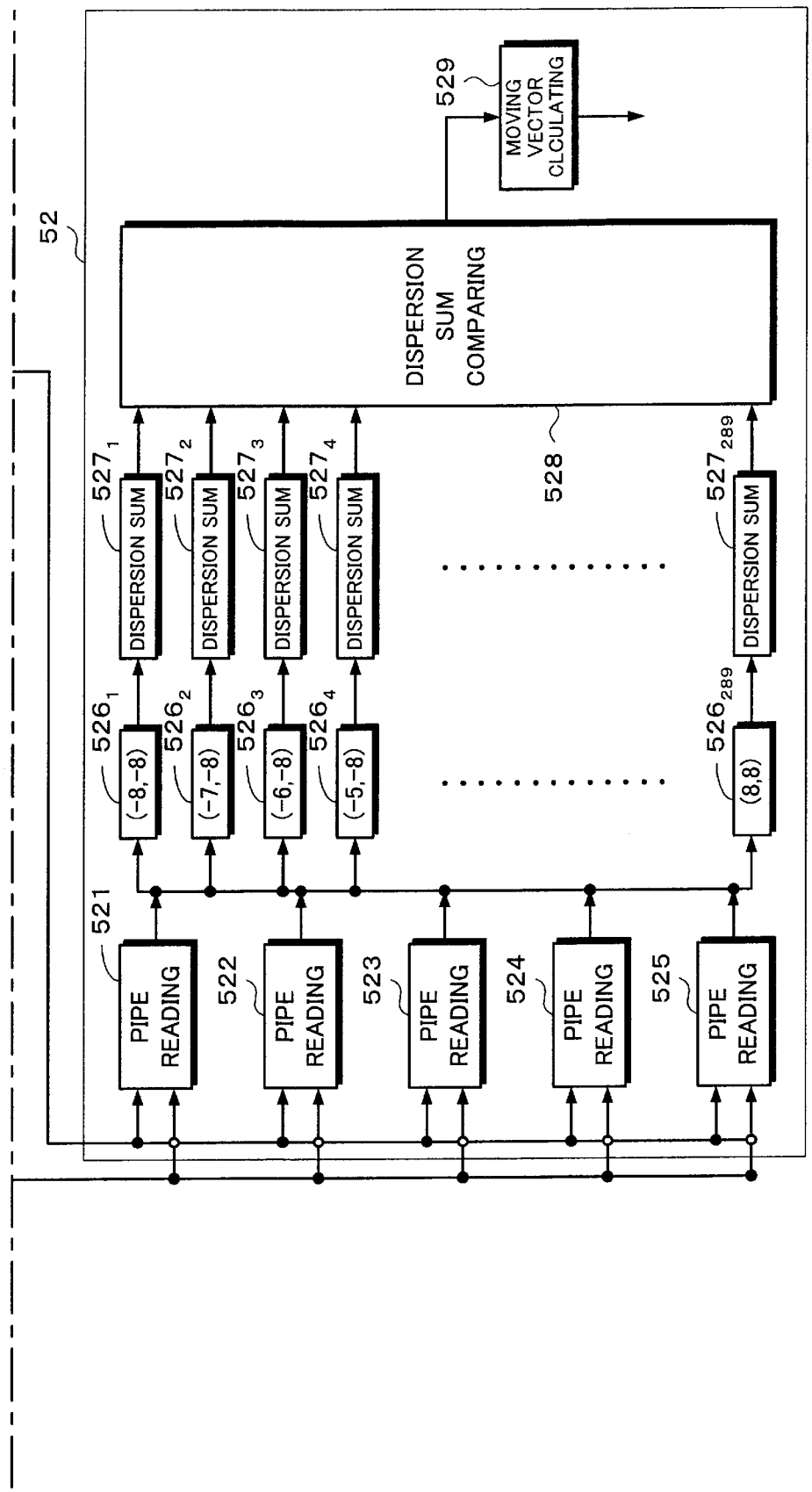
FIG. 23 is a block diagram for explaining the structure of a part of the fifth embodiment of the present invention.

From the above described point of view, the fifth embodiment of the present invention can be accomplished. FIG. 23 shows an example of the structure of the fifth embodiment of the present invention. Referring to FIG. 23, an input picture is supplied to a frame memory portion 10. Since the structure and operation of the frame memory portion 10 are the same as those of the frame memory portion 10 shown in FIG. 13, for simplicity, the redundant description is omitted. Picture data of a considered frame f [0] is supplied from a frame memory fm [0] to area extracting circuits $511_1$, $511_2$, . . . , and $511_{19}$ of a pipe range designating portion 51.

In addition, picture data of frames f [−2] to f [+2] are supplied from frame memories fm [−2] to fm [+2] to straight line parameter estimating circuits $521_1$, $521_2$, . . . , and $521_{144}$ of a moving vector calculating portion 52.

The area extracting circuits $511_1$, $511_2$, . . . , and $511_{19}$ extract a square area containing pixels 0 to 11 in each of the horizontal direction and the vertical direction, a square area containing pixels 0 to 22 in each of the horizontal direction and the vertical direction, . . . , and a square area containing pixels 0 to 209 (=11×19) in each of the horizontal direction and the vertical direction from picture data of the considered frame f [0]. The picture data of the extracted areas are supplied to horizontal DR calculating circuits $513_1$, $513_2$, . . . , and $513_{19}$ and vertical DR calculating circuits $514_1$, $514_2$, . . . , and $514_{19}$.

The horizontal DR calculating circuits $513_1$ to $513_{19}$ and the vertical DR calculating circuits $514_1$ to $514_{19}$ calculate horizontal DR values and vertical DR values corresponding to the supplied picture data and supply the calculated values to a comparing circuit 515. The comparing circuit 515 compares the supplied calculated values so as to designate a pipe range.

In the example, the size of the initialized extracted area, the widening ratio of a newly extracted area, the threshold values of DR values, and so forth can be freely designated. As a new area, besides a widened area of the current extracted area, the current extracted area may be rotated or reduced. In addition, as was described with reference to FIG. 15B, the density of pixels in an extracted area may be varied.

In the above-described example, horizontal DR values and vertical DR values of an extracted area are compared with threshold values so as to designate a pipe range. Alternatively, the DR value of the entire extracted area may be compared with a predetermined threshold value. In addition, as a quantity that represents the activity of an extracted area, the dispersion of the entire extracted area may be calculated. Corresponding to the calculated result, a pipe range may be designated.

Parameters that represent the range designated by the pipe range designating portion 51 are supplied to pixel reading circuits 521 to 525 of a moving vector calculating portion 52. The pixel reading circuits 521 to 525 read picture data from the frame memories fm [−2] to fm [+2] corresponding to the supplied pixel position information and hold them.

Next, the case of which an area containing pixels 0 to 11 in each of the horizontal direction and the vertical direction (namely, 12×12=144 pixels) is designated as a pipe range will be described. As was described above, straight line parameters are represented as relative pixel positions of pixels in a searching range corresponding to pixels in the pipe range. In the example, the number of straight line parameters are 17×17=289 of (−8, −8), (−7, −8), . . . , and (+8, +8).

Corresponding to the straight line parameters, pixel extracting circuits $526_1$, $526_2$, . . . , and $526_{289}$ are disposed. The pixel extracting circuits $526_1$, $526_2$, . . . , and $526_{289}$ extract pixel data of individual frames on parallel straight lines of pipes corresponding to the straight line parameters from data held in pixel reading circuits $520_1$ to $520_5$. In the example, one straight line parameter corresponds to 144 parallel straight lines. The extracted pixel data are supplied to dispersion sum calculating circuits $527_1$, $527_2$, . . . , and $527_{289}$.

Dispersion sum calculating circuits $527_1$ to $527_{289}$ calculate the sums of dispersions corresponding to the supplied pixel data and supply the calculated sums to a dispersion sum comparing circuit 528. The dispersion sum comparing circuit 528 compares the sums of dispersions so as to designate straight line parameters of which the sum of dispersions is minimum and outputs the designated straight line parameters. A moving vector calculating circuit 529 calculates a moving vector corresponding to the supplied straight line parameters.

Figure 24:
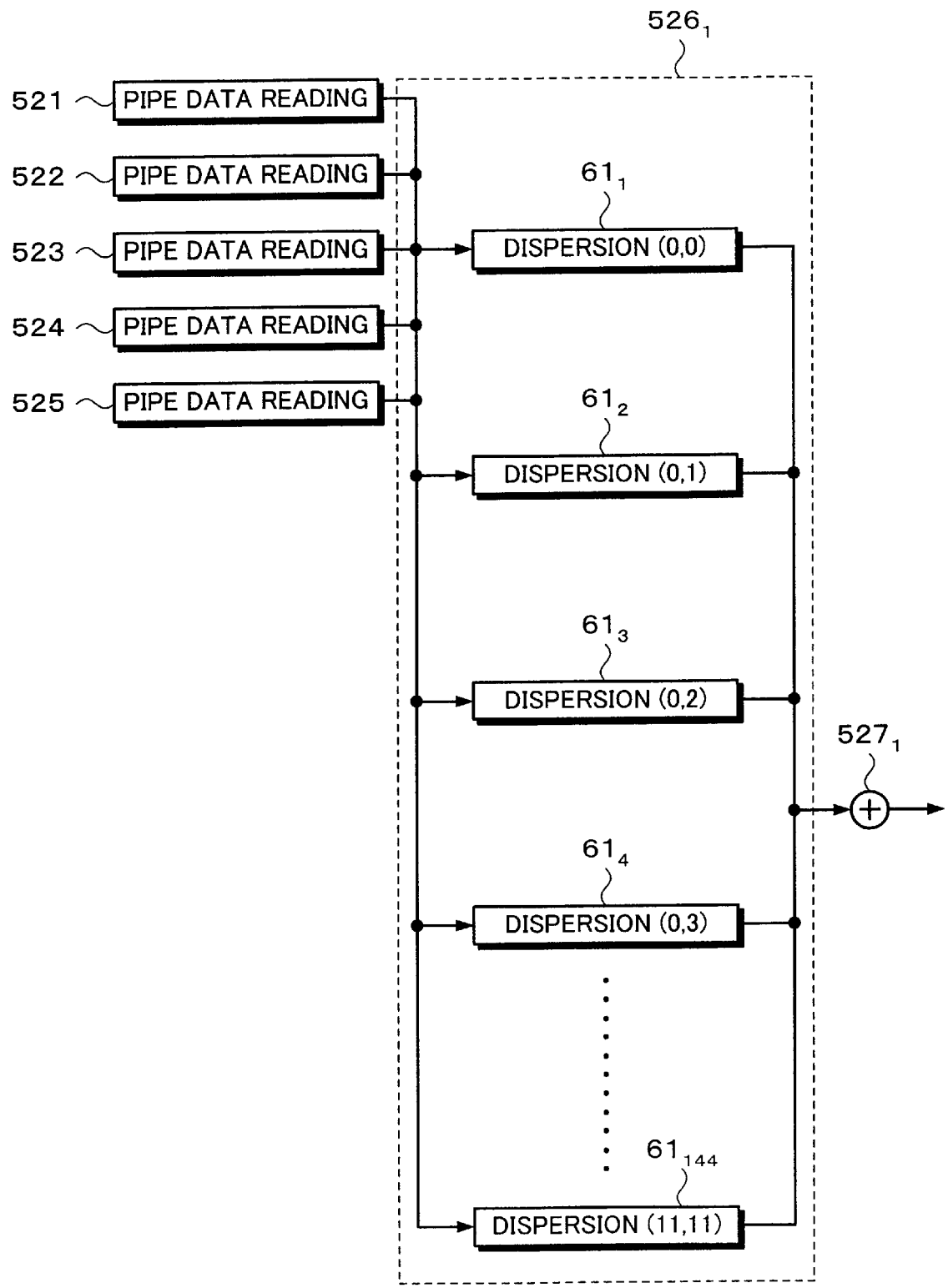
FIG. 24 is a block diagram for explaining the structure of the fifth embodiment of the present invention.

FIG. 24 shows an example of the structure of each of the dispersion sum calculating circuits $527_1$ to $527_{289}$. In the example, it is assumed that a pipe range contains pixels 0 to 11 in each of the horizontal direction and the vertical directions. Dispersion calculating circuits $61_1, 61_2, \ldots,$ and $61_{144}$ extract pixels of individual frames on straight lines that compose a pipe corresponding to straight line parameters from data held in pixel reading circuits 521 to 525 and calculate the dispersions of pixel values of the extracted pixels.

The calculated values are supplied from the dispersion calculating circuits $61_1, 61_2, \ldots,$ and $61_{144}$ to an adder 62. The adder 62 adds the supplied calculated values so as to calculate the sum of the dispersions.

The structure and operation described with reference to FIGS. 23 and 24 are based on the case that an area containing pixels 0 to 11 in each of the horizontal direction and the vertical direction is designated as a pipe range. However, it should be noted that the present invention can be applied to the case that an area containing more pixels is designated as a pipe range. In such a case, more dispersion calculating circuits may be disposed. Alternatively, a dispersion calculating circuit may be operated on time division basis.

In the example described with reference to FIG. 23, an area containing pixels 0 to 17 in each of the horizontal direction and the vertical direction (namely, a total of 289 pixels) is designated as a searching range. However, it should be noted that the present invention is not limited to such an area. In other words, as a searching area, any area can be freely designated.

According to the fourth embodiment and the fifth embodiment of the present invention, dispersions of pixels on parallel straight lines that compose a pipe corresponding to straight line parameters are calculated. A moving vector is designated corresponding to straight line parameters of which the sum of the calculated values is minimum. Alternatively, the sum of the absolute values of the differences of the average value of pixels on parallel straight lines composing a pipe and each pixel value may be calculated. Corresponding to straight line parameters of which the calculated value is minimum, a moving vector may be designated.

Alternatively, the sum of the differences of adjacent pixels on parallel straight lines that compose a pipe may be calculated. A moving vector may be calculated corresponding to straight line parameters of which the sum of the calculated values is minimum. Alternatively, the DR values of pixels on parallel straight lines that compose a pipe may be calculated. Corresponding to the calculated values, a moving vector may be calculated.

According to the first embodiment to the fifth embodiment of the present invention, moving vectors of considered pixels are calculated corresponding to picture data of five frames including a considered frame. However, it should be noted that the present invention is not limited to such a structure. For example, a moving vector calculating process may be performed corresponding to picture data of three frames including a considered frame.

It should be noted that the present invention is not limited to the above-described first to fifth embodiments.

According to the present invention, a moving vector is calculated corresponding to the result of a calculating process for pixel values of pixels of a plurality of frames on a plurality of straight lines that pass through a plurality of pixels of a considered frame in space and time. Thus, the influence of noise can be suppressed in a calculating process of a moving vector. In addition, even if a noise level varies in various manners, an adequate process corresponding thereto can be performed.

In particular, when an area of a considered frame containing a plurality of pixels on a straight line such as a voting range or a pipe range is variably designated corresponding to the DR values of pixel values of pixels of the area, an adequate process can be performed corresponding to the size of an object. In other words, the motion of a smaller object can be adequately processed using a smaller voting range or a smaller pipe range.

In addition, in a flat portion of which pixel values do not largely vary, using a larger voting range or a larger pipe range, a moving vector can be adequately detected unlike with the case that the block matching operation is performed in a fixed block size.

Although the amount of calculation depends on the size of a voting range or a pipe range, a moving vector can be accurately detected with a smaller amount of calculation than that of the block matching method.

In particular, when a moving vector is calculated in the above-described method and the positions of class taps and predictive taps are designated for the class category adaptive process, predictive taps of for example five frames can be designated at a time. In that case, as a result of the noise elimination of the class category adaptive process, the deterioration of the picture quality such as an occurrence of a trailing shape portion can be prevented or suppressed. In addition, noise can be eliminated without an occurrence of an unclear picture.

In such a case, unlike with the block matching method, since tap positions of only one frame do not deviate upon an occurrence of a partial error of a moving vector, noise can be effectively eliminated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture processing apparatus, comprising:

extracting means for extracting a plurality of pixels on each straight line that extends in the chronological direction and that passes through each of objective pixels including a considered pixel of a picture signal and a plurality of pixels in the vicinity of the considered pixel;

similarity detecting means for detecting the similarity in each of the straight lines according to the pixel values of a plurality of pixels extracted by said extracting means in each of the straight lines for each of the objective pixels against the considered pixel; and moving vector calculating means for calculating a moving vector of the considered pixel according to the similarity detected in each of the straight lines for each of the objected pixels.

2. The picture processing apparatus as set forth in claim 1, wherein the objective pixels are designated according to picture data of a frame containing the considered pixel.

3. The picture processing apparatus as set forth in claim 2, wherein said extracting means extracts a plurality of pixels from a frame containing the considered pixel, calculates dynamic range of the pixel values of the extracted pixels, and designates the objective pixels according to the dynamic range.

4. The picture processing apparatus as set forth in claim 2, wherein said extracting means extracts a plurality of pixels from a frame containing the considered pixel, calculates dispersion of the pixel values of the extracted pixels, and designates the objective pixels according to the calculated dispersion.

5. The picture processing apparatus as set forth in claim 1, wherein said extracting means extracts pixels of at least three frames including a frame containing the considered pixel on each of the straight lines.

6. The picture processing apparatus as set forth in claim 1, wherein said similarity detecting means includes:
calculating means for calculating the pixel values of the plurality of pixels extracted by said extracting means in the direction of each of the straight lines; and
means for detecting the similarity according to an output of said calculating means.

7. The picture processing apparatus as set forth in claim 6, wherein said calculating means calculates dispersion of the pixel values of the plurality of pixels.

8. The picture processing apparatus as set forth in claim 7, wherein said similarity detecting means detects the similarity that is reversely proportional to the dispersion of the pixel values of the plurality of pixels calculated by said calculating means.

9. The picture processing apparatus as set forth in claim 6, wherein said calculating means calculates sum of the absolute values of the differences of the pixel values of the adjacent pixels of the plurality of pixels.

10. The picture processing apparatus as set forth in claim 6, wherein said calculating means calculates dynamic range of the pixel values of the plurality of pixels.

11. The picture processing apparatus as set forth in claim 6, wherein said calculating means calculates average value of the pixel values of the plurality of pixels and calculates sum of the absolute values of the differences of the average value and each of the pixel values of the plurality of pixels.

12. The picture processing apparatus as set forth in claim 1, wherein said moving vector calculating means includes:
voting means for voting straight line parameters of a straight line of which the similarity is maximum for each of the objective pixels; and
moving vector determining means for determining a moving vector of the considered pixel according to the voted result of said voting means.

13. The picture processing apparatus as set forth in claim 1, further comprising:
a plurality of frame memories for storing respective frames of a picture signal;
first picture extracting means for extracting at least one pixel from each frame stored in said plurality of frame memories;

class categorizing means for categorizing a class according to the pixel value of the pixel extracted by said first picture extracting means;
a coefficient memory for storing a predetermined predictive coefficient set corresponding to each class and outputting a predictive coefficient set corresponding to the class categorized result of said class categorizing means;
second picture extracting means for extracting at least one pixel from each of the frames stored in said plurality of frame memories;
output picture generating means for calculating the output of said coefficient memory and data of the picture area extracted by said second picture extracting means so as to generate an output picture; and
extracting position designating means for designating the position of a pixel extracted by at least one of said first picture extracting mans and said second picture extracting means according to the moving vector calculated by said moving vector calculating means.

14. A picture processing apparatus, comprising:
extracting means for extracting a plurality of pixels on a particular straight line that passes through a considered pixel of a picture signal and that extends in the chronological direction and on each of straight lines parallel to the particular straight line that pass through pixels in the vicinity of the considered pixel;
similarity detecting means for detecting similarity in the direction of each of the straight lines for the plurality of pixels extracted by said extracting means in the direction of each of the straight lines; and
moving vector calculating means for calculating a moving vector of the considered pixel according to the similarity detected in the direction of each of the straight lines.

15. The picture processing apparatus as set forth in claim 14, wherein the pixels in the vicinity of the considered pixel are designated according to picture data of a frame containing the considered pixel.

16. The picture processing apparatus as set forth in claim 14, wherein said extracting means extracts pixels of at least three frames containing a frame including the considered pixel on each of the straight lines.

17. The picture processing apparatus as set forth in claim 14, wherein said similarity detecting means includes:
calculating means for calculating the pixel values of the plurality of pixels extracted in the direction of each of the straight lines by said extracting means; and
similarity determining means for determining the similarity according to an output of said calculating means.

18. The picture processing apparatus as set forth in claim 17, wherein said calculating means calculates dispersion of a plurality of pixels that are on the particular straight line and that are extracted by said extracting means, the dispersion of the plurality of pixels on each of straight lines in parallel with the particular straight line that pass through the pixels in the vicinity of the considered pixel, sum of absolute values of differences of a pixel of a considered frame and each of pixels of the other frames or the sum of the absolute values of the differences of the adjacent pixels and calculates the sum of the calculated values.

19. The picture processing apparatus as set forth in claim 14, further comprising:

a plurality of frame memories for storing respective frames of a picture signal;

first picture extracting means for extracting at least one pixel from each frame stored in said plurality of frame memories;

class categorizing means for categorizing a class according to the pixel value of the pixel extracted by said first picture extracting means;

a coefficient memory for storing a predetermined predictive coefficient set corresponding to each class and outputting a predictive coefficient set corresponding to the class categorized result of said class categorizing means;

second picture extracting means for extracting at least one pixel from each of the frames stored in said plurality of frame memories;

output picture generating means for calculating the output of said coefficient memory and data of the picture area extracted by said second picture extracting means so as to generate an output picture; and extracting position designating means for designating the position of a pixel extracted by at least one of said first picture extracting means and said second picture extracting means according to the moving vector calculated by said moving vector calculating means.

20. A picture processing method, comprising the steps of:

(a) extracting a plurality of pixels on each straight line that extends in the chronological direction and that passes through each of objective pixels including a considered pixel of a picture signal and a plurality of pixels in the vicinity of the considered pixel;

(b) detecting the similarity in each of the straight lines according to the pixel values of a plurality of pixels extracted at the step (a) in each of the straight lines for each of the objective pixels against the considered pixel; and (c) calculating a moving vector of the considered pixel according to the similarity detected in each of the straight lines for each of the objected pixels.

21. The picture processing method as set forth in claim 20, further comprising the steps of:

(d) storing respective frames of a picture signal;

(e) extracting at least one pixel from each frame stored at the step (d);

(f) categorizing a class according to the pixel value of the pixel extracted at the step (e);

(g) outputting a predictive coefficient set among coefficient sets previously determined for each class according to the class categorized result obtained at the step (f);

(h) extracting at least one pixel from each of the frames stored at the step (d);

(i) calculating the coefficient set output at the step (g) and data of the picture area extracted at the step (h) so as to generate an output picture; and (j) designating the position of a pixel extracted by at least one of the step (e) and the step (h) according to the moving vector.

22. A picture processing method, comprising the steps of:

(a) extracting a plurality of pixels on a particular straight line that passes through a considered pixel of a picture signal and that extends in the chronological direction and on each of straight lines parallel to the particular straight line that pass through pixels in the vicinity of the considered pixel;

(b) detecting the similarity in the direction of each of the straight lines for the plurality of pixels extracted at the step (a) in the direction of each of the straight lines; and (c) calculating a moving vector of the considered pixel according to the similarity detected in the direction of each of the straight lines.

23. The picture processing method as set forth in claim 22, further comprising the steps of:

(d) storing respective frames of a picture signal;

(e) extracting at least one pixel from each frame stored at the step (d);

(f) categorizing a class according to the pixel value of the pixel extracted at the step (e);

(g) outputting a predictive coefficient set among coefficient sets previously determined for each class to the class categorized result obtained at the step (f);

(h) extracting at least one pixel from each of the frames stored at the step (d);

(i) calculating the coefficient set output at the step (g) and data of the picture area extracted at the step (h) so as to generate an output picture; and (j) designating the position of a pixel extracted by at least one of the step (e) and the step (h) according to the moving vector.

* * * * *